United States Patent
Snoke et al.

(10) Patent No.: US 6,487,964 B2
(45) Date of Patent: Dec. 3, 2002

(54) APPARATUS FOR COOKING MEAT

(75) Inventors: Phillip Jack Snoke, Atlanta, GA (US); George C. McKerrow, Jr., Atlanta, GA (US); Ronald William Scharbo, Atlanta, GA (US)

(73) Assignee: Innovative Culinary Concepts, L.L.C., Atlanta, GA (US)

( * ) Notice: Subject to any disclaimer, the term of this patent is extended or adjusted under 35 U.S.C. 154(b) by 0 days.

(21) Appl. No.: 09/774,394

(22) Filed: Jan. 31, 2001

(65) Prior Publication Data

US 2002/0100371 A1 Aug. 1, 2002

(51) Int. Cl.[7] ............... A47J 37/04; A47J 43/18
(52) U.S. Cl. ............... 99/345; 99/419; 99/426; 99/446; 99/447
(58) Field of Search ............... 99/345–347, 401, 99/400, 415–418, 419–421 V, 425, 426, 446–450; 426/509, 523

(56) References Cited

U.S. PATENT DOCUMENTS

| | | | |
|---|---|---|---|
| 1,819,301 A | 8/1931 | Noble | |
| 2,142,800 A * | 1/1939 | Olexsy | 99/345 |
| 2,790,585 A * | 4/1957 | Smith | 99/419 |
| 2,821,904 A | 2/1958 | Arcabosso | 99/346 |
| 3,280,907 A | 10/1966 | Hoffman | 165/185 |
| 3,713,378 A * | 1/1973 | West et al. | 99/346 |
| 3,908,532 A | 9/1975 | Underwood | 99/347 |
| 3,922,960 A * | 12/1975 | Lewis | 99/346 |
| 4,421,017 A * | 12/1983 | Ross | 99/426 X |
| 4,450,759 A | 5/1984 | Steibel | 99/419 |
| D286,498 S | 11/1986 | Rosenkrantz | D7/409 |
| 4,633,773 A | 1/1987 | Jay | 99/426 |
| 4,709,626 A | 12/1987 | Hamlyn | 99/426 |
| 4,715,273 A * | 12/1987 | Riesselmann | 99/419 X |
| 4,738,192 A * | 4/1988 | Odom, Jr. | 99/419 X |
| 4,810,856 A | 3/1989 | Jovanovic | 219/401 |
| 4,924,768 A * | 5/1990 | Jay | 99/425 |
| 5,069,117 A | 12/1991 | Schlessel | 99/419 |
| D322,911 S | 1/1992 | Schmengler | D7/359 |
| 5,081,916 A | 1/1992 | Kuhling et al. | 99/419 |
| 5,106,642 A | 4/1992 | Ciofalo | 426/509 |
| 5,301,602 A | 4/1994 | Ryczek | 99/345 |
| D347,143 S | 5/1994 | Awyong | D7/403 |
| 5,421,254 A * | 6/1995 | McDonald | 99/346 |
| 5,539,184 A | 7/1996 | Su | 219/388 |
| 5,575,198 A | 11/1996 | Lowery | 99/426 |
| 5,662,028 A | 9/1997 | Fraga | 99/419 |
| D397,581 S | 9/1998 | Lowery | D7/409 |
| 5,842,409 A * | 12/1998 | Loffler | 99/426 X |
| 5,893,320 A | 4/1999 | Demaree | 99/419 |
| 6,026,734 A | 2/2000 | Dadez | 99/345 |
| 6,062,131 A | 5/2000 | Holland | 99/345 |
| 6,119,585 A | 9/2000 | Guidry | 99/345 |
| 6,125,739 A | 10/2000 | Jernigan | 99/345 |
| 6,192,792 B1 | 2/2001 | Gremillion | 99/426 |
| 6,216,586 B1 | 4/2001 | Burgin | 99/339 |
| 6,272,976 B1 | 8/2001 | Berryman | 99/340 |
| 6,314,869 B1 | 11/2001 | Bourgeois, Jr. | 99/340 |
| 6,349,632 B1 | 2/2002 | Beck, Jr. | 99/345 |
| 6,427,582 B1 * | 8/2002 | Mason | 99/345 X |

* cited by examiner

*Primary Examiner*—Timothy F. Simone
(74) *Attorney, Agent, or Firm*—Bracewell & Patterson LLP

(57) ABSTRACT

An apparatus and methods for cooking meat are provided. The apparatus preferably includes a base having at least one liquid container connected to an upper surface of the base and a liquid collecting cavity formed in the upper surface of the base between outer walls of the liquid container and outer peripheries of the base. The apparatus also preferably includes at least one separate meat infusor positioned to contact the base and to overlie and substantially surround at least inner walls of the liquid container. The meat infusor preferably has an infusor body and a plurality of openings positioned in side peripheries of the infusor body so that when liquid positioned in the liquid container heats, steam from the liquid travels through the infusor body, through the openings therein, and toward meat positioned to overlie the infusor body.

26 Claims, 17 Drawing Sheets

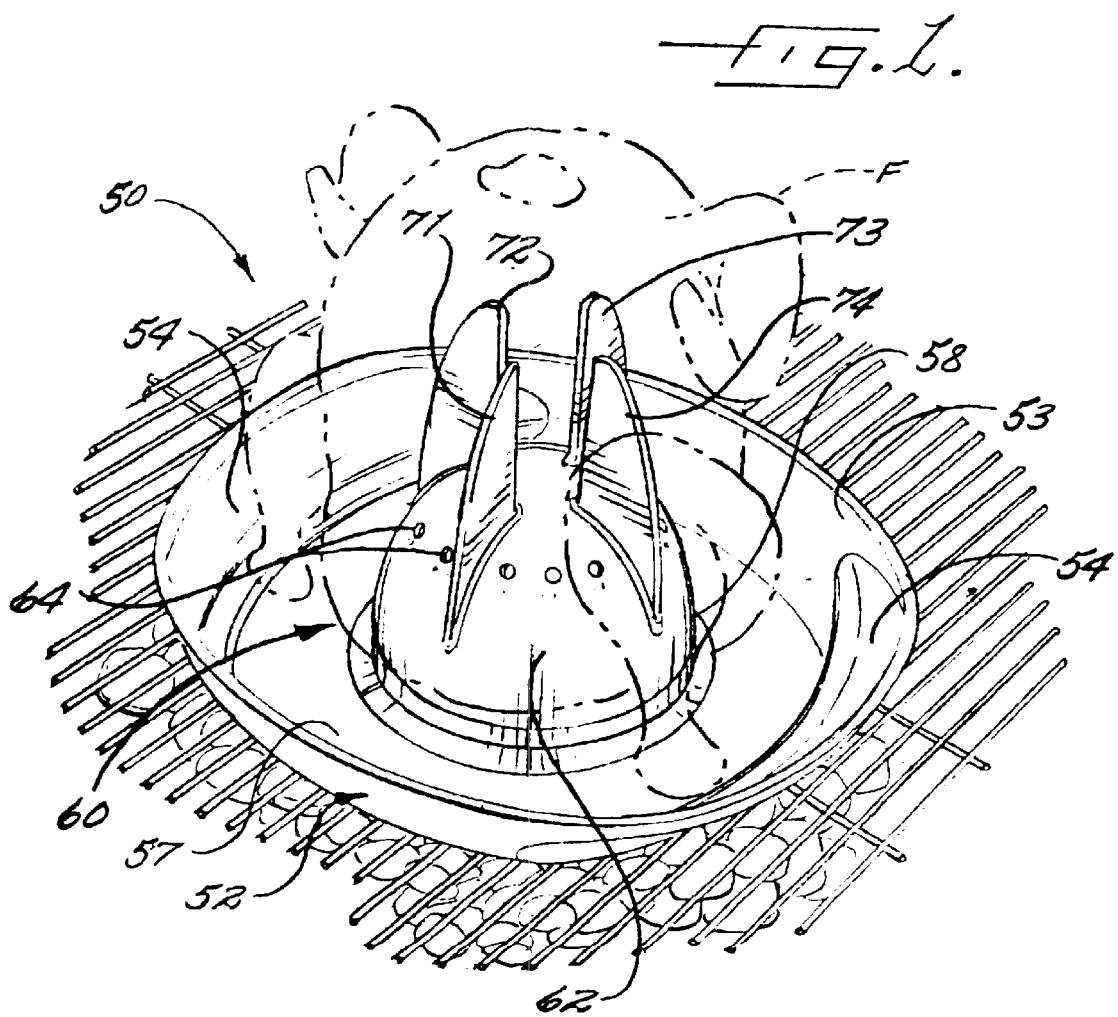

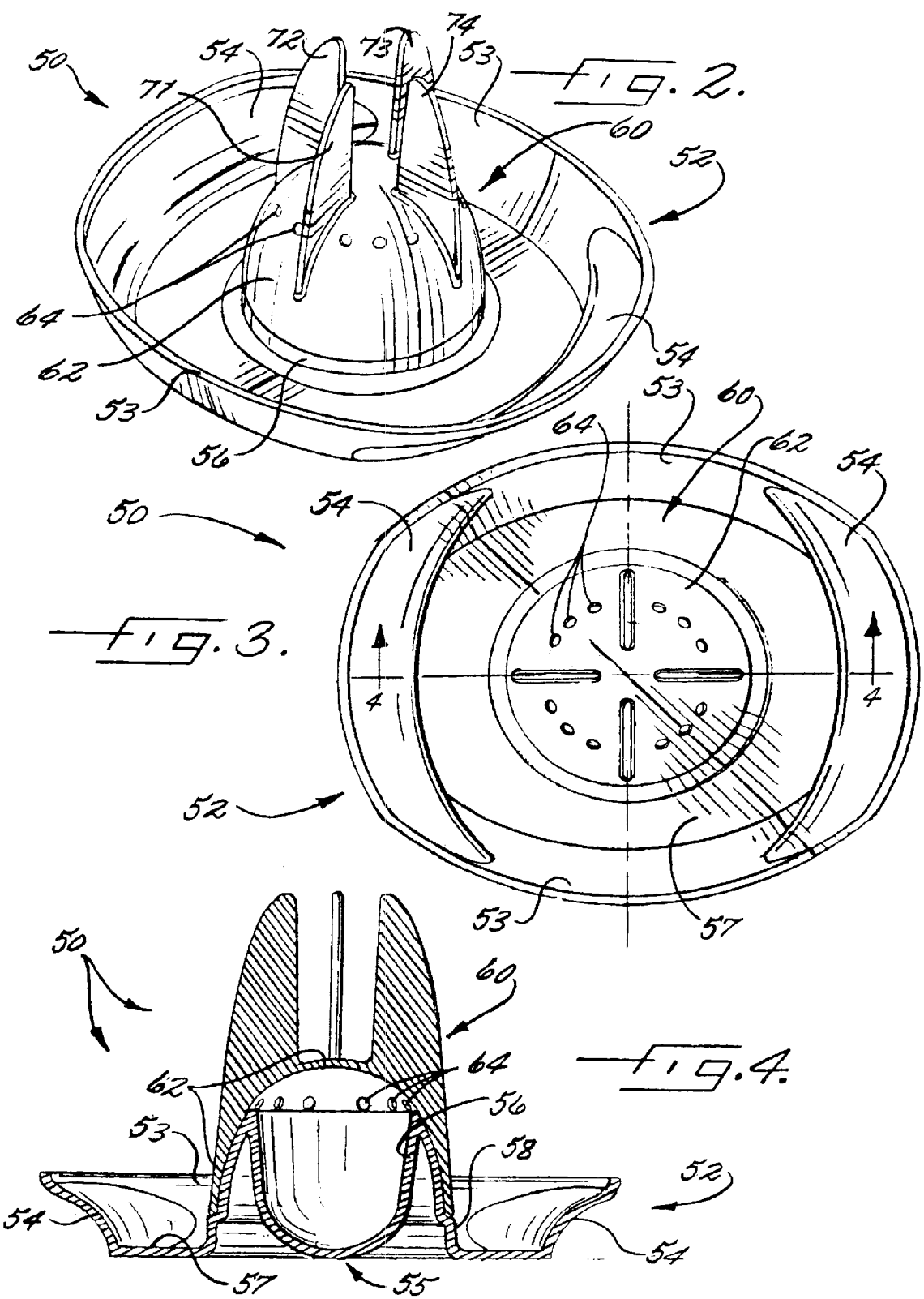

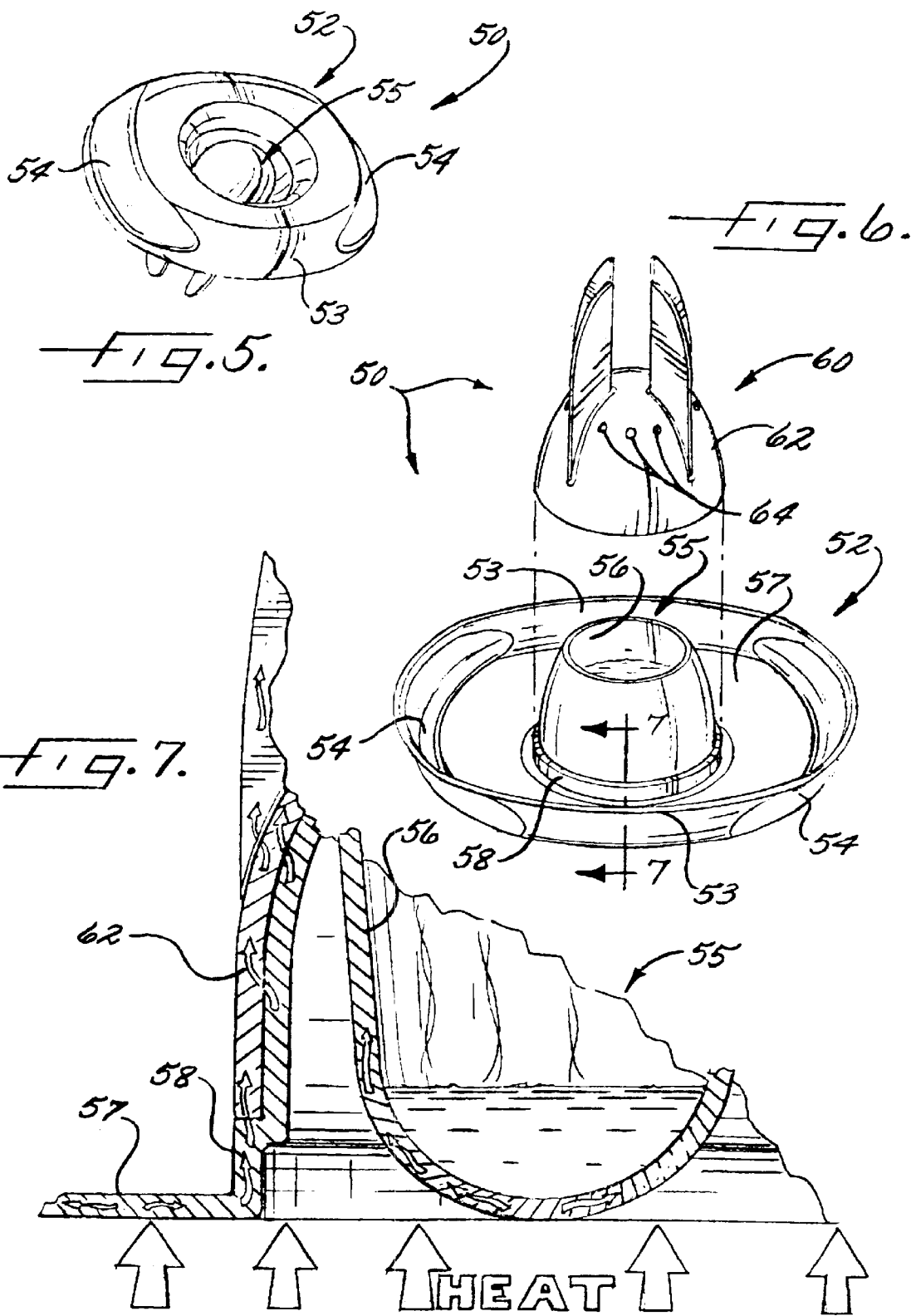

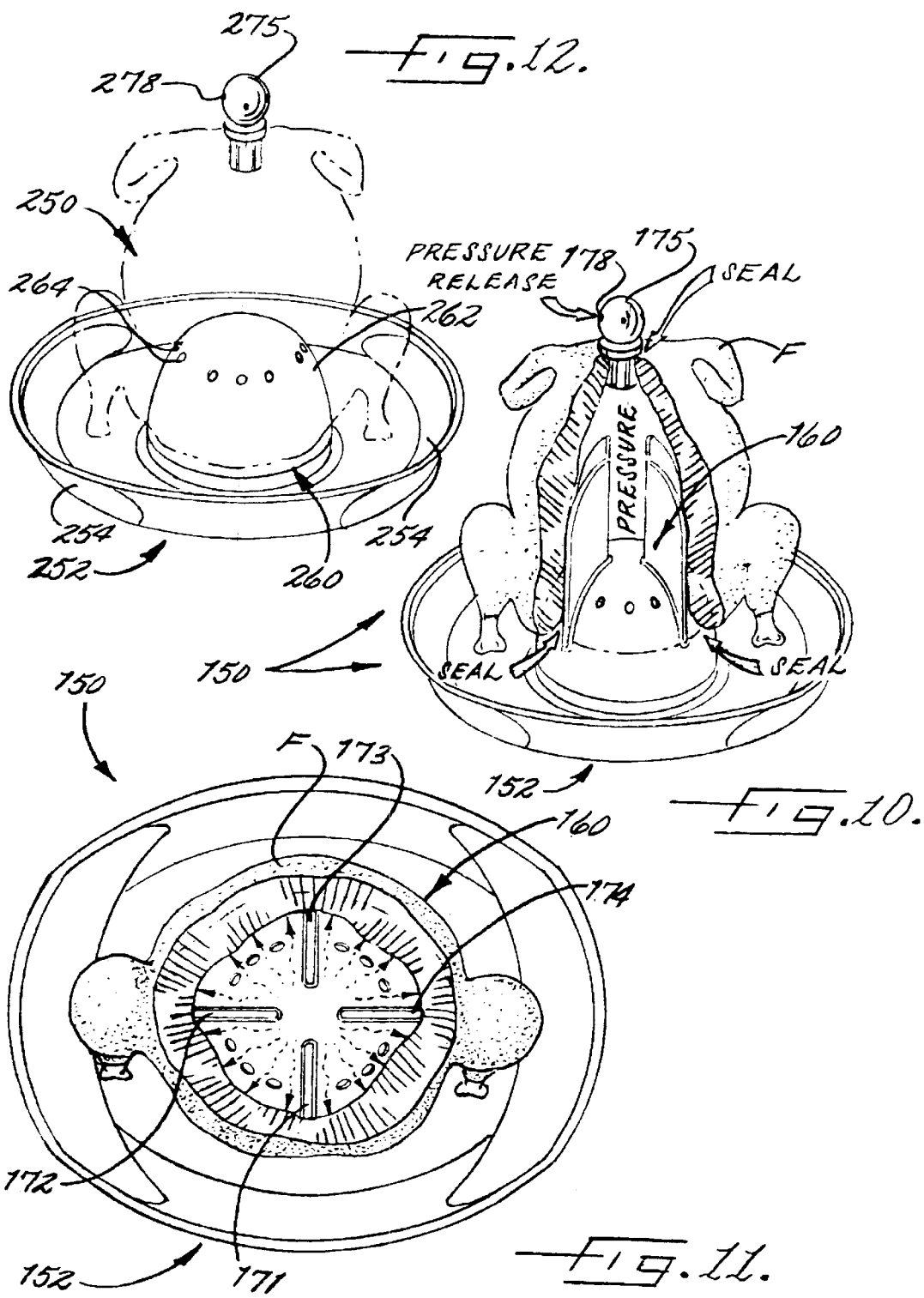

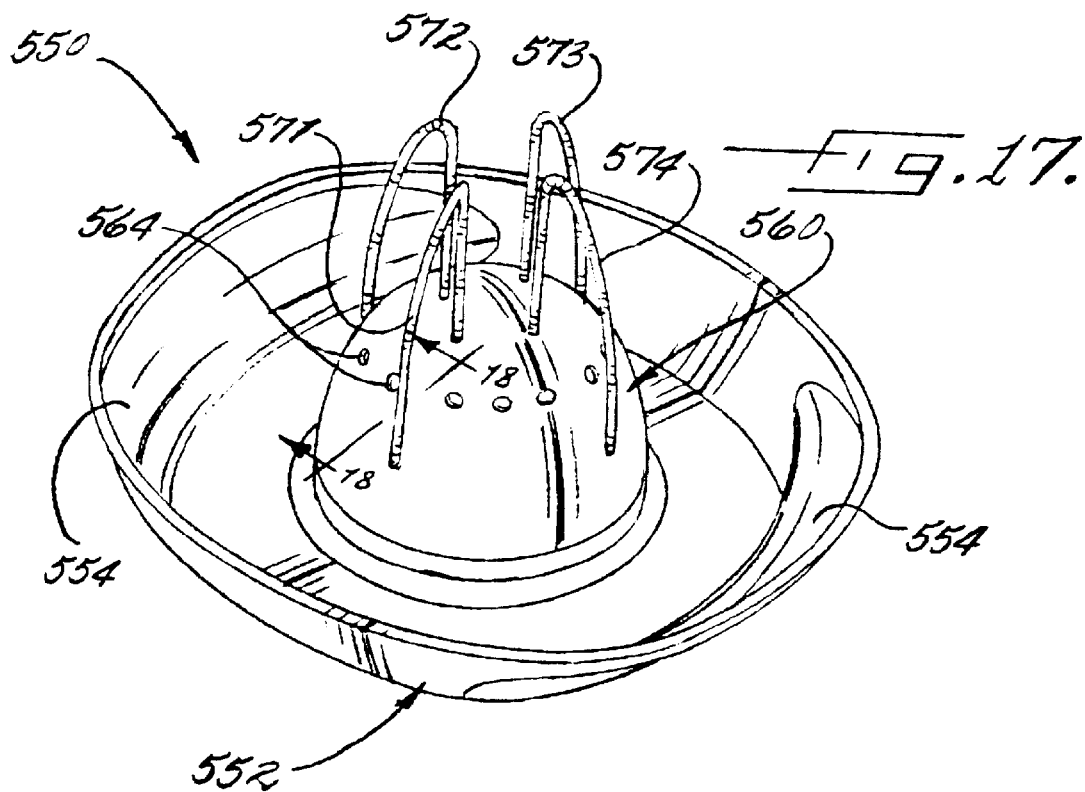
FIG. 17.
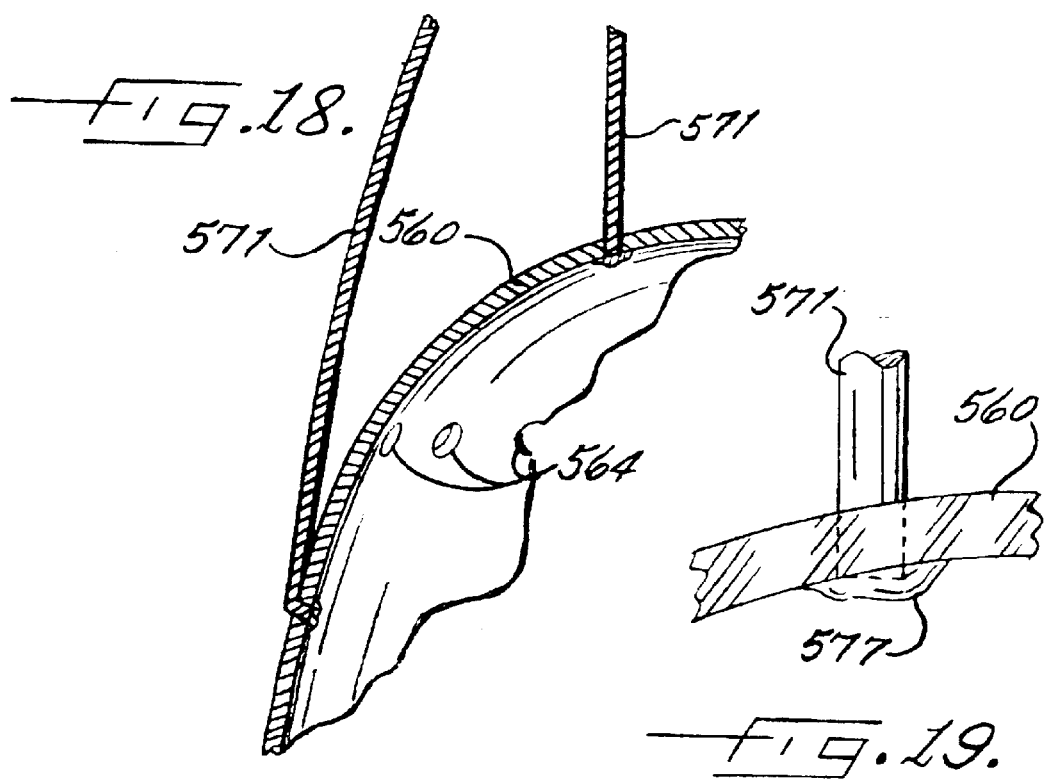
FIG. 18.
FIG. 19.

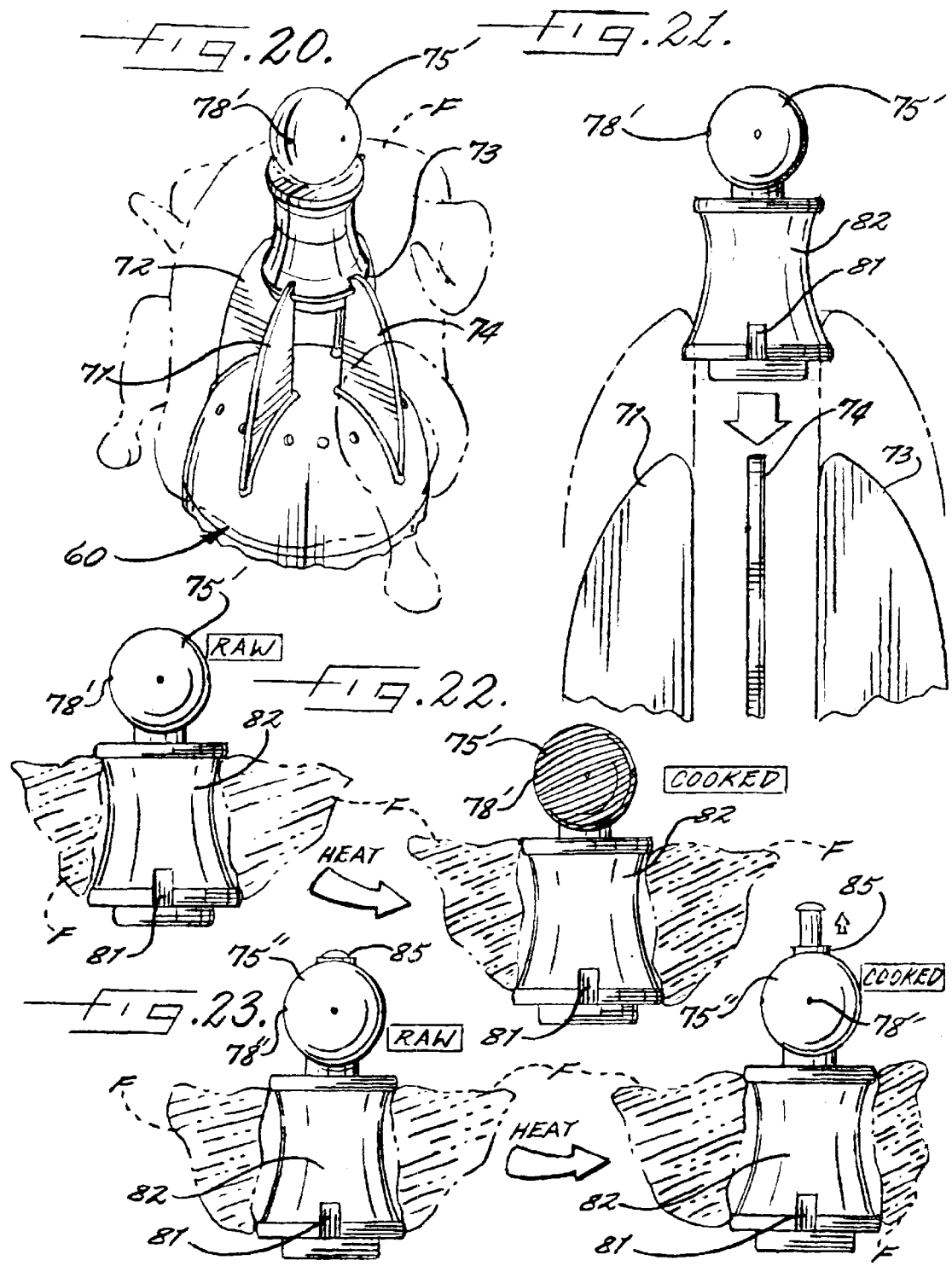

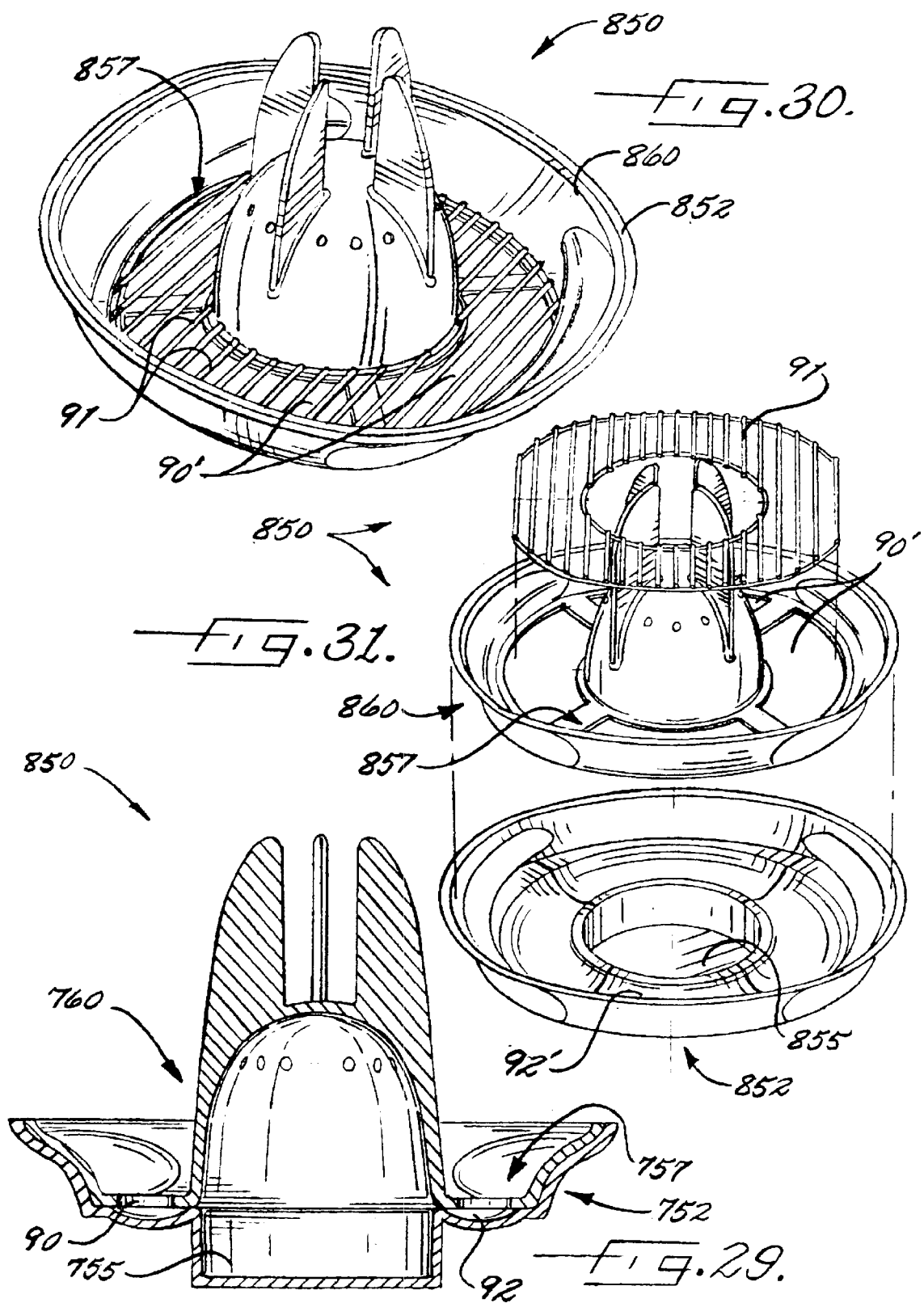

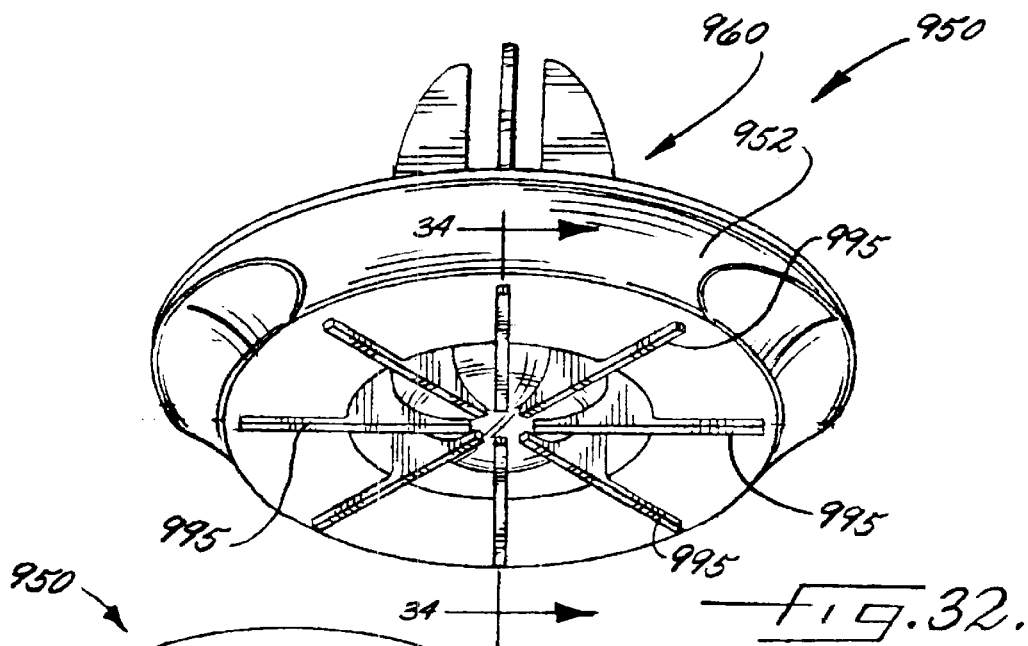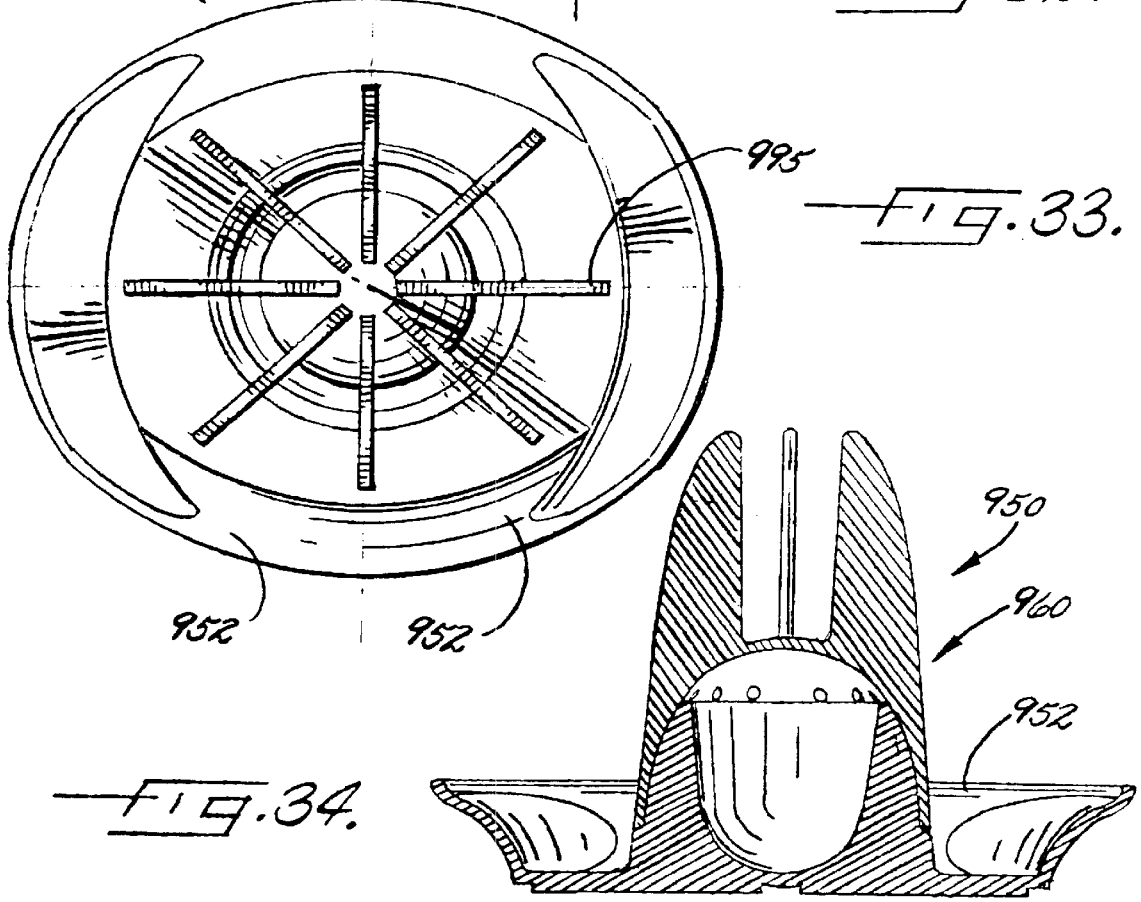

APPARATUS FOR COOKING MEAT

Field of the Invention

The present invention relates to the field of cooking and, more particularly, to an apparatus and methods for cooking meat.

BACKGROUND OF THE INVENTION

Over the years, various devices and systems have been developed for cooking meat such as in an oven, on a stove top, over a grill, or open flame of fire. These meats, for example, include beef, lamb, poultry, pork, seafood, and other types of meats. In order to cook these meats, the devices often use either heat from an oven, stove, or grill, or often have their own built-in heat source, e.g., which heats from a power source.

Also, for cooking poultry or fowl and some other types of meats, it has been recognized as being desirable to marinade and baste the meat for added flavor. Some poultry basting devices recognize that it is important to get steam from a liquid, i.e., either the meat liquid itself, water, or a marinade, into the inner portions of the meat. An example can be seen in U.S. Pat. No. 2,821,904 by Arcabosso titled "Self-Operated Interior Baster For Food Objects."

More recently, it has become popular to use open cans of beer or lemonade to insert into an inner cavity of a chicken or other fowl when positioned on a grill so that the steam from the heated can of beer or lemonade acts as a marinade to baste or steam the inner cavity of the chicken when roasting. Also, similar cannister type devices are shown in U.S. Pat. No. 5,893,320 by Demaree titled "Device For Cooking Fowl" and U.S. Pat. No. 6,062,131 by Holland titled "Roasting Stand Adapted To Deliver Flavored Steam During The Cooking Process." Nevertheless, without the addition of a drip pan, these devices allow juices and marinade to readily drip or drain from the fowl into the grill or open flames and provide little or no heat control or shielding from the heat. This, in turn, can cause the chicken or other fowl to blacken or char quickly, hurt the taste, make the chicken less appetizing, and often not allow for thorough and controlled cooking of the meat.

Additionally, when the cannister type devices are positioned into an inner cavity of a fowl, the outer peripheries of the cannister abut against the inner surfaces of the fowl in the region where contact between the meat and cannister is made. This leaves little or no space for steam to cook the fowl. Instead, the metal contacts the surface and transfers heat to the surface. Further, openings are also often left at the upper or surrounding lower ends of the cavity so that steam readily escapes or leaves the cavity once it is applied. This can make the cooking process longer and can reduce the flavor because much of the steam, and any marinade flavor associated therewith, is not applied to the meat.

SUMMARY OF THE INVENTION

With the foregoing in mind, the present invention advantageously provides a meat cooking apparatus and method which not only roasts the meat but enhances exposure of inner surfaces of a meat, such as fowl or poultry, when positioned thereon to the marinade or flavor of the steam, e.g., infusion, during cooking to thereby use a combination of cooking techniques. The present invention also advantageously provides a meat cooking apparatus and methods which allow a user to readily use different types of marinades or cooking liquids to enhance cooking of the meat with steam from the marinade being exposed to inner surfaces of the meat for enhanced steam absorption of the meat by pressure sealing regions in upper and lower portions of a cavity of the meat and by not blocking ready access of the flavored steam to the inner surfaces of the cavity of the meat. The present invention additionally provides a meat cooking apparatus and methods which have a plurality of cooking components but are still easy to assemble, easy to use, and easy to clean after use. The apparatus and methods also allow vegetables, garnishes, or other food products to be readily roasted or cooked in regions surrounding where the meat is cooked. The present invention further advantageously provides an apparatus and method for cooking meat which greatly inhibits or prevents charring or blackening of the skin of the meat during the cooking process and yet readily speeds up cooking time for cooking the meat. The present invention still further provides an apparatus and methods for more controlled cooking of meat such as poultry, especially in commercial cooking applications.

More particularly, a meat cooking apparatus of the present invention preferably includes a proximal-end cavity opening seal and steam passing member positioned to substantially close a proximal end opening of a main inner cavity of a fowl and allow steam to pass therethrough to the main inner cavity. The apparatus also preferably has a distal-end cavity opening seal member positioned to substantially close a distal end opening of the main inner cavity of the fowl and substantially prevent steam from readily escaping through the distal end opening.

The meat cooking apparatus of the present invention also preferably has a base having at least one liquid container connected to an upper surface of the base and a liquid collecting cavity formed in the upper surface of the base between outer walls of the liquid container and outer peripheries of the base. The apparatus still also preferably includes at least one separate meat infusor positioned to contact the base and to overlie and substantially surround at least inner walls of the liquid container. The meat infusor preferably provides the proximal-end cavity opening seal and steam passing member and preferably includes an infusor body which has a proximal end portion with a greater circumference than the distal end portion to enhance insertion of the meat infusor into the main inner cavity of the fowl to be cooked and enhance closing off of the inner cavity with the proximal end portion when the meat infusor is inserted into the main inner cavity. The meat infusor preferably has an infusor body and a plurality of openings positioned in side peripheries of the infusor body so that when liquid positioned in the liquid container heats, steam from the liquid readily travels through the infusor body, through the openings therein, and toward inner surfaces of meat positioned to overlie the infusor body.

In effect, this substantially or fully closing off of the main inner cavity advantageously allows the fowl or other meat to be cooked by at least two types of methods, namely roasting from the heat of the grill, oven, stove, or other heat source and steam infusing from the steam generated and infused into the inner cavity from the heated liquid container and through the infusor. The sealing or substantial sealing of the meat cavity, for example, can advantageously provide a steam-type pressure to enhance penetration or absorption of flavor from the marinade in the meat such as in the breast meat of poultry. These areas, otherwise, are often difficult to penetrate or flavor with other roasting devices.

The present invention also advantageously provides a method of cooking meat. This method preferably includes substantially sealing both lower and upper openings of an inner cavity of a fowl when positioned in a vertical position on a substantially horizontally extending cooking surface and supplying steam to the inner cavity through the lower end or proximal opening of the inner cavity to thereby increase the steam pressure within the inner cavity.

Another method of cooking meat, such as fowl, is provided which preferably includes simultaneously supplying roasting heat to outer surfaces of a fowl and supplying steam to the inner cavity when the inner cavity is substantially sealed. The method can also advantageously include providing a meat infusor to substantially seal a proximal end opening of the inner cavity of the fowl through which steam is supplied to the inner cavity and providing a meat plug member to substantially seal a distal end opening of the inner cavity of the fowl.

Yet another method of cooking meat, such as fowl, is provided which preferably includes positioning a meat infusor to substantially close off outer peripheries of a proximal end of a main inner cavity of the fowl and supplying steam through the meat infusor to the inner cavity of the fowl. The steam is preferably provided by the step of heating a liquid underlying the meat infusor with a heat source so that the liquid changes state to the steam. The method can also include supplying heat to outer surfaces of the fowl to thereby roast the fowl with the same heat source which heats the liquid that changes state to form the steam.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 1 is a perspective environmental view of an apparatus for cooking meat as used in conjunction with a conventional grill according to an embodiment of the present invention;

FIG. 2 is a perspective view of an apparatus for cooking meat according to an embodiment of the present invention;

FIG. 3 is a top plan view of an apparatus for cooking meat according to an embodiment of the present invention;

FIG. 4 is a sectional view of an apparatus for cooking meat taken along line 4—4 of FIG. 3 according to an embodiment of the present invention;

FIG. 5 is a bottom perspective view of an apparatus for cooking meat according to an embodiment of the present invention;

FIG. 6 is an exploded perspective view of a base and an infusor of an apparatus for cooking meat according to an embodiment of the present invention;

FIG. 7 is an enlarged sectional view of an apparatus for cooking meat taken along line 7—7 of FIG. 6 to illustrate the flow path of steam according to an embodiment of the present invention;

FIG. 10 is fragmentary perspective view of an apparatus for cooking meat having another embodiment of a meat plug member according to still another embodiment of the present invention;

FIG. 11 is a fragmentary top plan view of a meat cooking apparatus having a fowl positioned thereon according to an additional embodiment of the present invention;

FIG. 12 is a perspective view of a meat cooking apparatus having a fowl shown in phantom lines positioned thereon according to still an additional embodiment of the present invention;

FIG. 17 is a perspective view of a meat cooking apparatus according to still a further embodiment of the present invention;

FIG. 18 is a fragmentary sectional view of an apparatus for cooking meat taken along line 18—18 of FIG. 17 according to the still further embodiment of the present invention;

FIG. 19 is an enlarged fragmentary view of a portion of a meat infusor of a meat cooking apparatus according to the still further embodiment of the present invention;

FIG. 20 is a fragmentary perspective view of a meat cooking apparatus according to still yet a further embodiment of the present invention;

FIG. 21 is a fragmentary elevational view of a meat cooking apparatus according to the still yet further embodiment of the present invention;

FIG. 22 is a side elevational view of an additional embodiment of a meat plug member of a meat cooking apparatus illustrating a color change in a sensor when the raw meat is cooked or done according to the still yet further embodiment of the present invention;

FIG. 23 is a side elevational view of a further embodiment of a meat plug member of a meat cooking apparatus illustrating a time release or pressure release sensor when the raw meat is cooked according to the still yet further embodiment of the present invention;

FIG. 29 is a sectional view of a meat cooking apparatus taken along line 29—29 of FIG. 27 according to the still yet additional embodiment of the present invention;

FIG. 30 is a perspective view of a meat cooking apparatus according to still yet another embodiment of the present invention;

FIG. 31 is an exploded perspective view of a meat cooking apparatus according to the still yet another embodiment of the present invention;

FIG. 32 is a bottom perspective view of a meat cooking apparatus according to still yet another additional embodiment of the present invention;

FIG. 33 is bottom plan view of a meat cooking apparatus according to the still yet another additional embodiment of the present invention;

FIG. 34 is a sectional view of a meat cooking apparatus taken along line 34—34 of FIG. 32 according to the still yet another additional embodiment of the present invention;

DETAILED DESCRIPTION OF PREFERRED EMBODIMENTS

Figure 8:
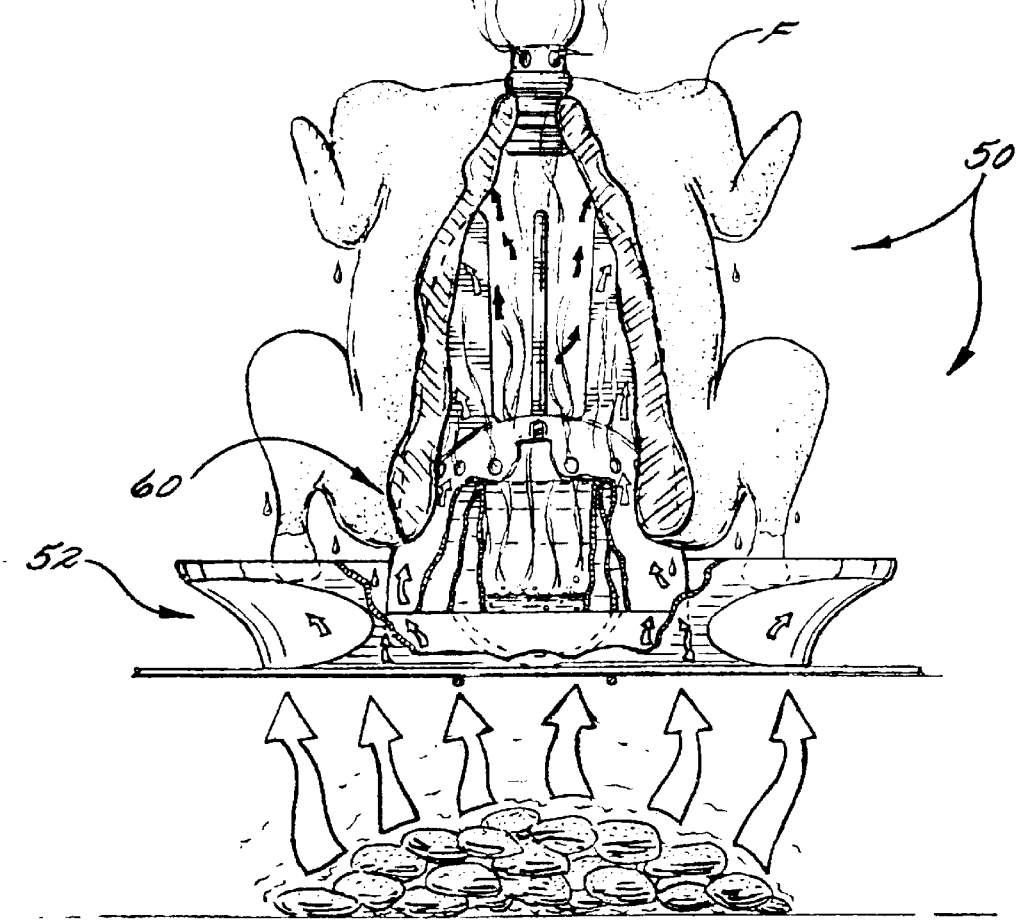
FIG. 8 is a fragmentary environmental perspective view of an apparatus for cooking meat having poultry positioned thereon and positioned on a conventional grill according to an embodiment of the present invention.
Figure 9:
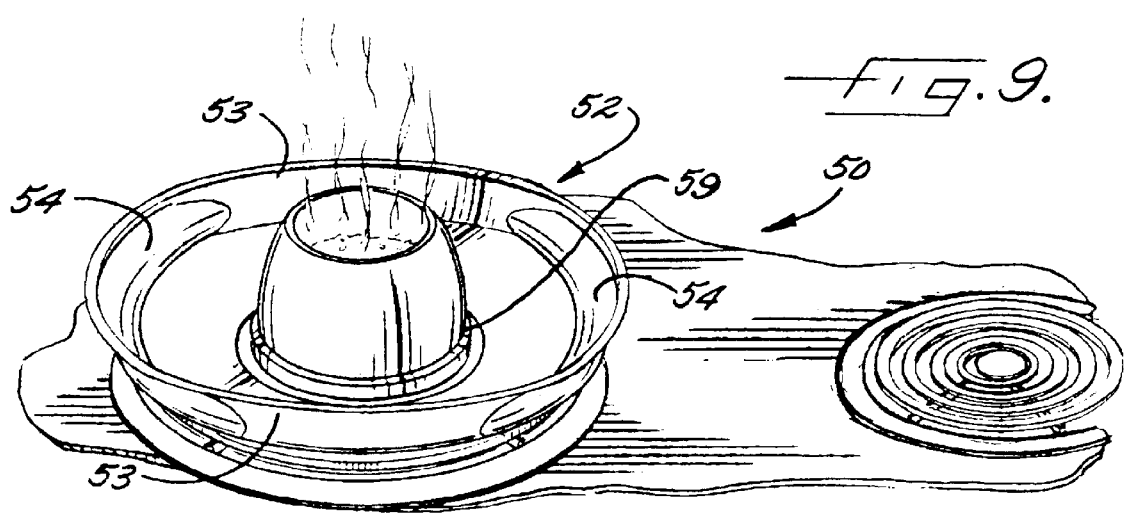
FIG. 9 is an environmental view of a base of an apparatus for cooking meat having a liquid positioned herein and the base thereof being positioned on a stove top for heating the liquid according to an embodiment of the present invention.

The present invention will now be described more fully hereinafter with reference to the accompanying drawings which illustrate preferred embodiments of the invention. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, the prime or double prime notation, if used, indicates similar elements in alternative embodiments. Also, incremental increases by 100 in the numbers also indicates similar elements in alternative embodiments.

FIGS. 1–9 illustrate an apparatus 50 for cooking meat F according to a first embodiment of the present invention which preferably includes a base 52 having at least one liquid container 55 connected to an upper surface 49 of a medial portion of the base 52 and a liquid collecting cavity 57 preferably positioned in the upper surface of the base 52 between outer walls 56 of the liquid container and outer peripheries 53 of the base (see FIGS. 4 and 6). As illustrated in this embodiment, the outer walls 56 of the liquid container 55 preferably form or define an inner wall 58 of the liquid collecting cavity 57 formed in the base 52. The base 52 also preferably has a plurality of handle members 54 associated with outer peripheries 53 of the base 52. The handle members 54, for example, can advantageously be formed in outer peripheral portions of the base 52 as recessed portions in the base as shown.

Additionally, the apparatus 50 preferably has at least one separate, and preferably readily detachable, meat infusor 60 preferably positioned to contact the base 52 and to overlie and substantially surround at least inner walls of the liquid container 55 (see FIGS. 1–4 and 6–7). The meat infusor 60 preferably provides a proximal end cavity opening seal and steam passing member positioned to substantially close peripheries of a proximal end opening of a main inner cavity of a fowl. This also allows steam to pass therethrough to the main inner cavity to the infusor and marinade the fowl under steam pressure. The meat infusor 60 preferably has an infusor body 62 and a plurality of openings 64 positioned in side peripheries of the infusor body 62 so that when liquid positioned in the liquid container 65 heats, steam from the liquid travels through the infusor body 62, through the openings 64 therein, and toward meat F positioned to overlie the infusor body 62 (see FIGS. 7–9).

As mentioned above, the meat infusor 60 preferably provides a proximal-end cavity opening seal and steam passing member positioned to substantially close a proximal end opening of an inner cavity of a fowl F and allow steam to pass therethrough to the inner cavity. The steam passes to the inner cavity from the heat liquid in the liquid container 55 when the base 52 is placed on a heat source such as a grill, stove, or oven as shown. The apparatus also preferably has a distal-end cavity opening seal member provided by a meat plug member 75 (see FIG. 8) positioned to substantially close a distal end opening of the main inner cavity of the fowl and substantially prevent steam from readily escaping through the distal end opening. This plug member could be a vegetable, e.g., a potato or onion, as well, but a tight or vented fit can be used. The sealing or substantially sealing advantageously provides a steam-type pressure to enhance penetration or absorption of flavor, spice, or other characteristics of the marinade into the meat such as the breast meat of poultry.

The liquid container 55 preferably includes an infusor body seat 58 associated with the outer walls of the liquid container 55 and substantially surrounding the liquid container 55 to seat a lower end of the meat infusor 60 thereon to substantially enclose and cover the liquid container 55. This position advantageously allows the infusor body 62 to firmly sit on the liquid container 55 to force or orient the steam upwardly through the infusor body 62 and prevent the steam or boiling liquid from the liquid container to readily travel to other portions of the base 52 without first traveling upwardly through the infusor body 62. Although other sizes and shapes are readily contemplated as would be understood by those skilled in the art, the liquid container 55 preferably holds about three to four ounces of liquid, such as marinades, beer, lemonade, water, wind, other alcoholic liquids, or other liquids which can be quickly heated to become steam for steam cooking the fowl. On the underside of the liquid container 55, air pockets are located between the inner walls where the liquid is stored and the outer walls which form a peripheral wall for the liquid collecting cavity of the base 52 (see FIGS. 7 and 36). This advantageously allows heat to surround the area where the liquid is held so that the liquid changes to a steam or vapor state much more quickly by attempting to maximize the exposure of the liquid container 55 to the underlying heat. As will be understood by those skilled in the art, this also allows much greater exposure to the fins or fowl supporting members 71, 72, 73, 74 as described further herein.

Figure 39:
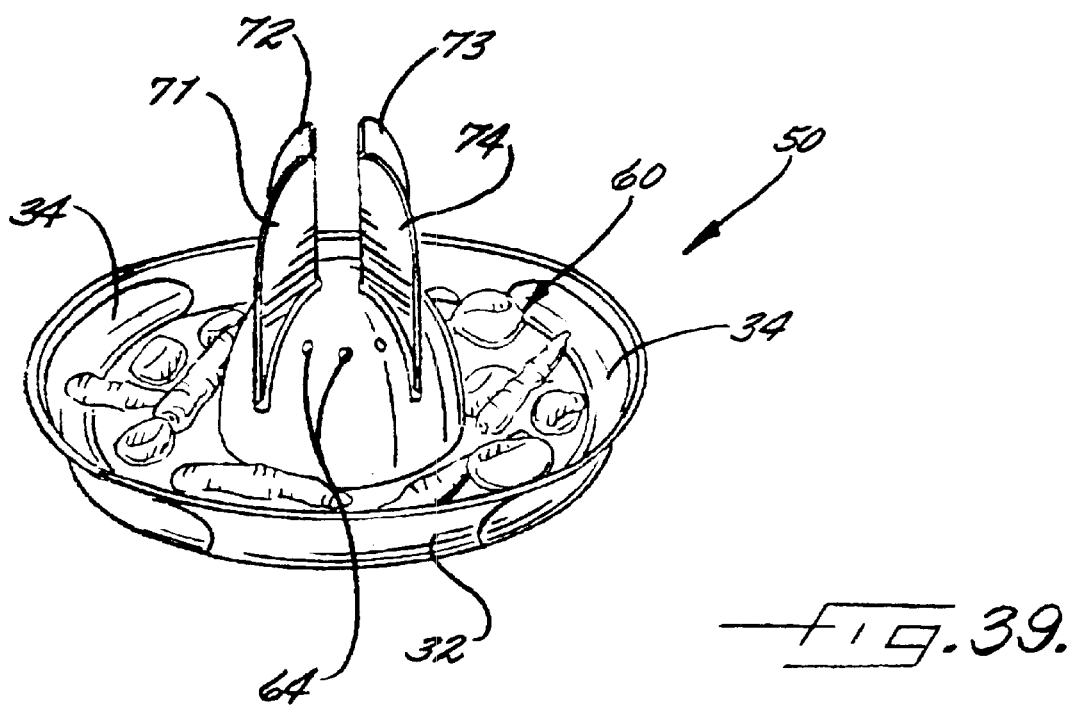
FIG. 39 is a perspective view of a meat cooking apparatus having a plurality of vegetables also positioned on the base for cooking as well according to an embodiment of the present invention.
Figure 40:
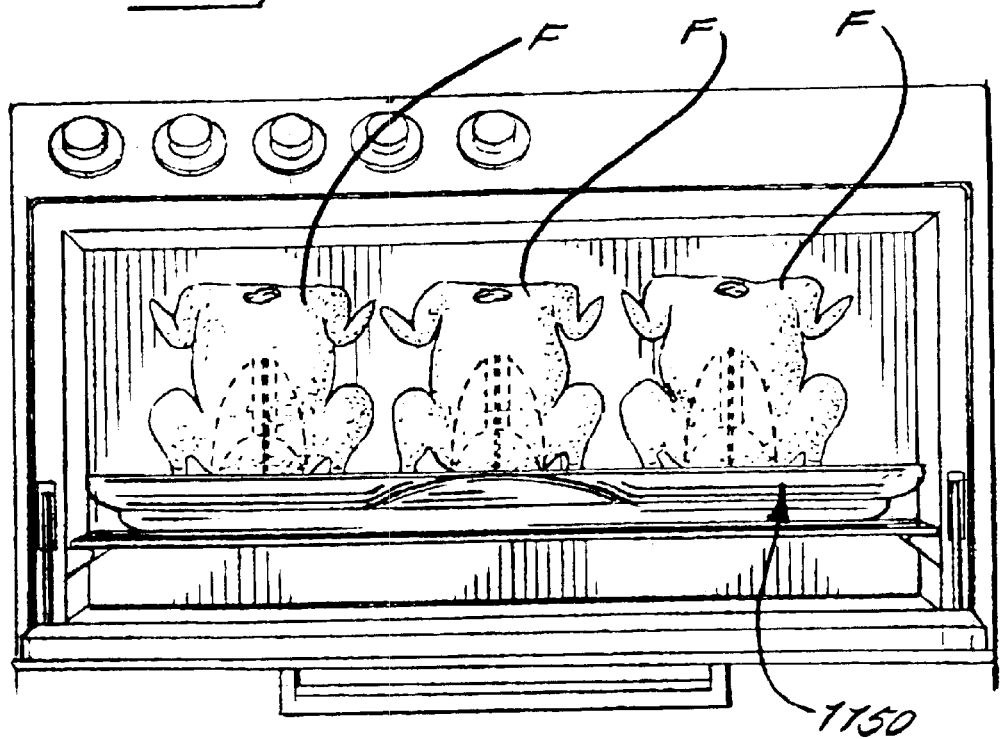
FIG. 40 is an environmental view of a meat cooking apparatus positioned in an oven according to the still also another embodiment of the present invention.

The base 52 of the apparatus 50 preferably surrounds the outer peripheries of the meat, e.g., fowl F, when positioned on the meat infusor 60. This position of the base 52, as well as preferably the material which forms the base 52, e.g., stainless steel, aluminum, copper, silver, laminate layers or alloys of metals, or other types of metals, synthetics, or other cooking materials as understood by those skilled in the art with respect to the meat and the meat infusor 60 advantageously provides a shield or protector from the direct heat from the heat source so that the meat such as a fowl F is not readily charred. In effect, the base 52 provides protection from open flames or other direct heat and yet advantageously easily collects meat and steam drippings from the meat during the cooking process which otherwise often enhance the charring and flame damaging process. As shown in FIG. 39, the base 52 also advantageously provides a platform for cooking vegetables, garnishes, or other products at the same time the meat is cooking both with the roasting process and marinating or cooking with heated fluid from the fowl or other meat drippings and steam (see also FIGS. 27–31). The base 52 can also even advantageously be used as a serving tray for a table, serving counter, or the like.

As illustrated, the infusor body 62 preferably has a proximal end portion with a greater circumference than the distal end portion to enhance insertion of the meat infusor 60 into an inner cavity of a fowl F to be cooked and enhance closing off of or sealing a lower end portion of the inner cavity with the proximal end portion of the infusor body 62 when the meat infusor 60 is inserted into the fowl main inner cavity. This closing off or sealing of lower end portions or a lower end opening of the main inner cavity of the fowl, e.g., where the internal organs of the fowl were once located prior to cleaning and/or dressing, is preferably a pressure type seal where outer peripheries of the inner cavity of the fowl F abuttingly contact outer peripheries of the infusor body 62.

Figure 13:
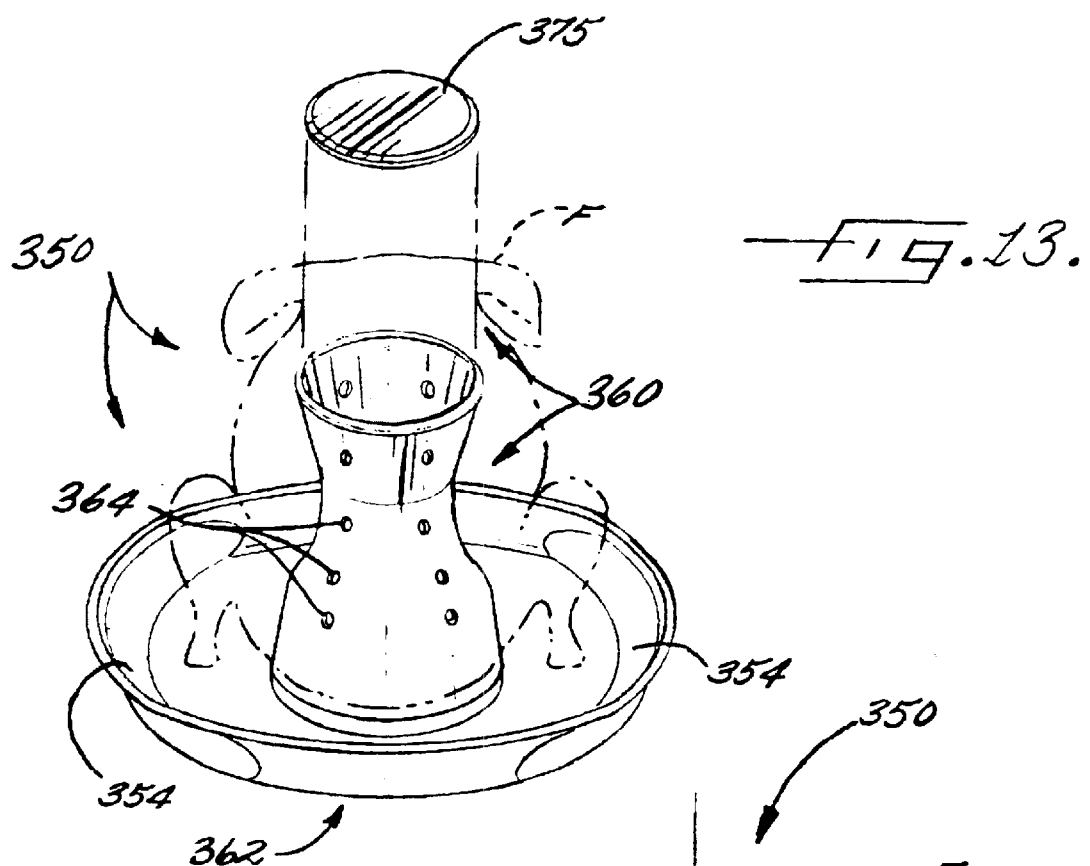
FIG. 13 is an exploded perspective view of a meat cooking apparatus having a fowl shown in phantom lines positioned thereon according to yet a further embodiment of the present invention.
Figure 14:
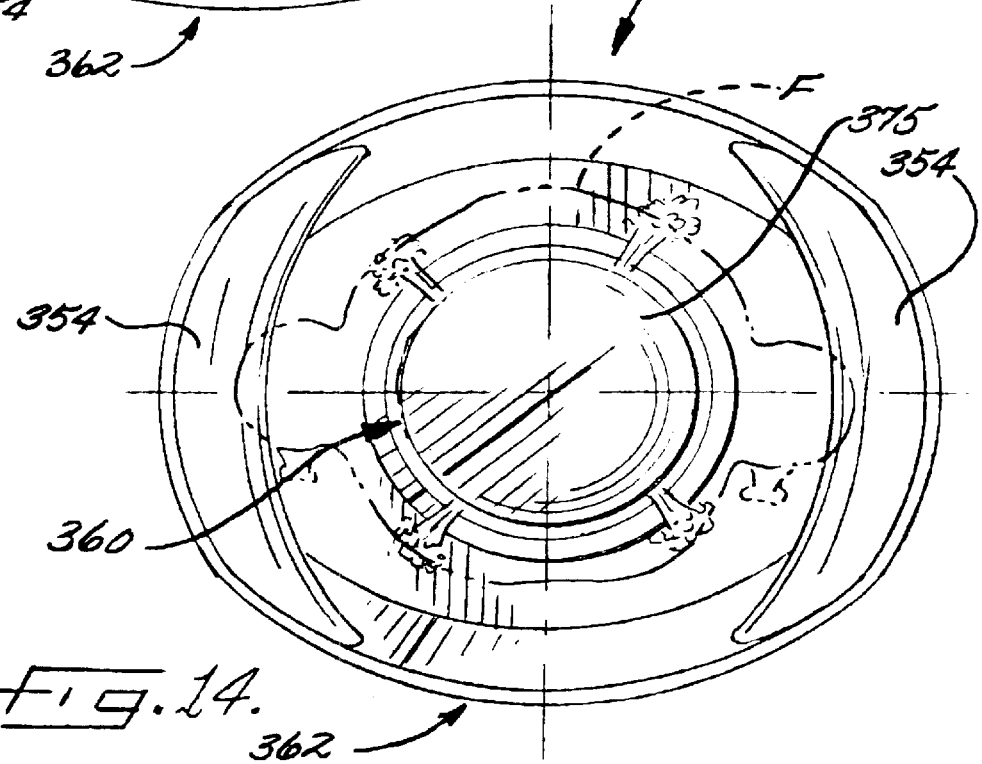
FIG. 14 is a top plan view of a meat cooking apparatus having a fowl shown in phantom lines positioned thereon according to the further embodiment of the present invention.
Figure 15:
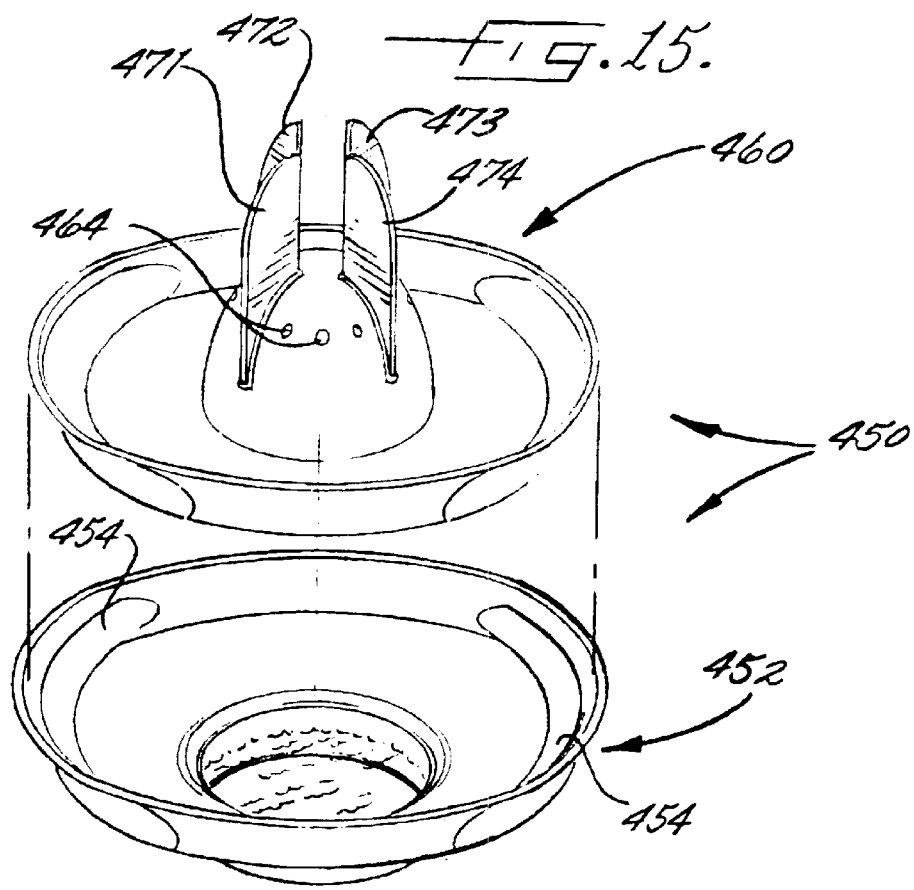
FIG. 15 is an exploded perspective view of a meat cooking apparatus according to yet a further embodiment of the present invention.
Figure 16:
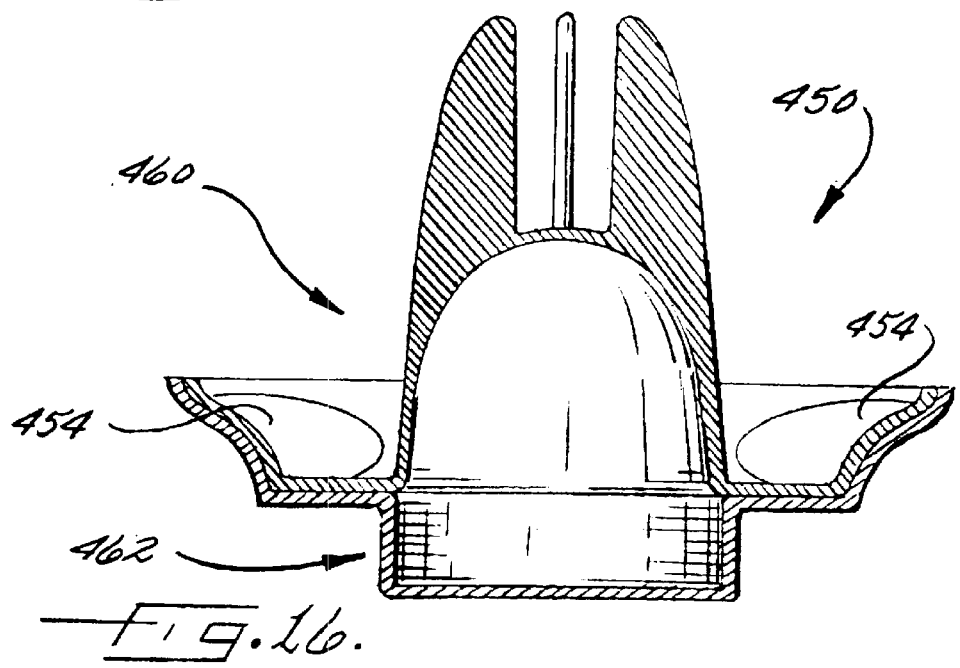
FIG. 16 is a sectional view of a meat cooking apparatus according to the yet further embodiment of the present invention.
Figure 24:
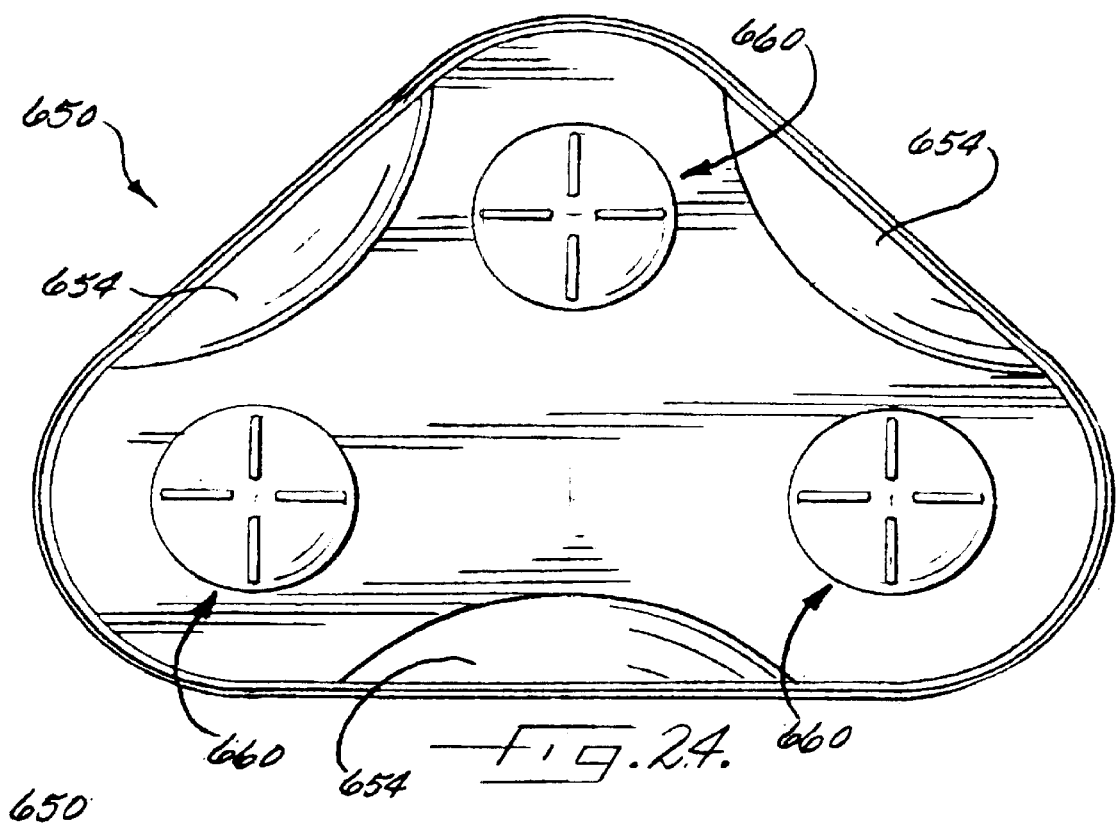
FIG. 24 is a top plan view of a meat cooking apparatus according to an additional further embodiment of the present invention.
Figure 25:
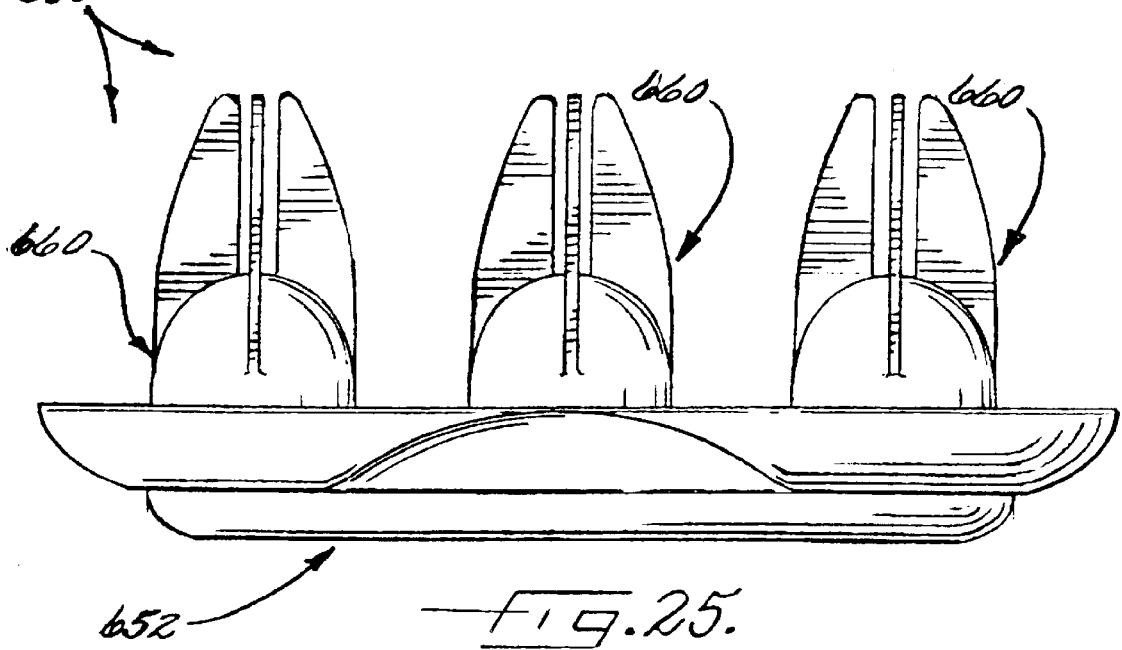
FIG. 25 is a side elevational view of a meat cooking apparatus according to the additional further embodiment of the present invention.
Figure 26:
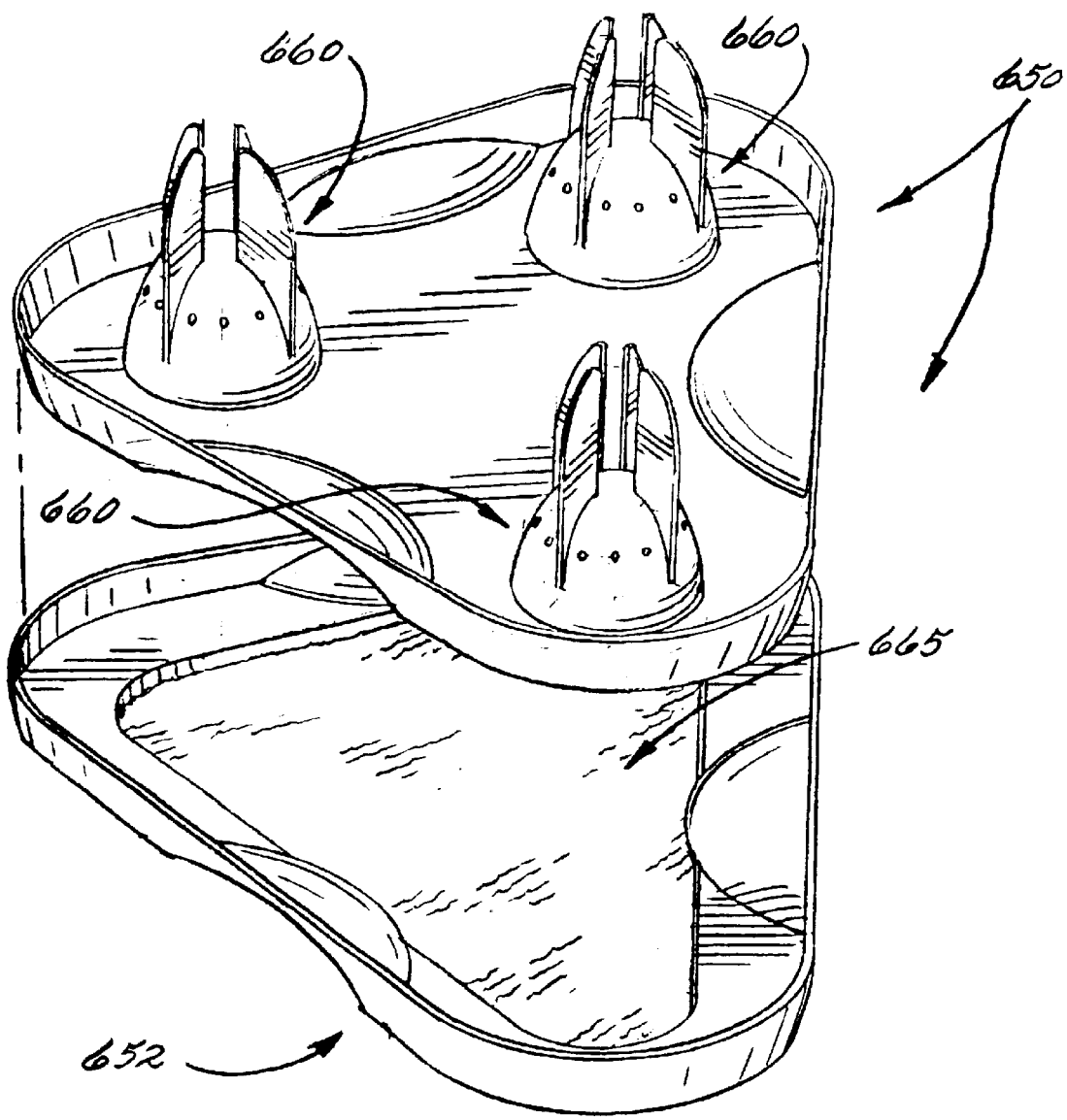
FIG. 26 is an exploded perspective view of a meat cooking apparatus according to the additional further embodiment of the present invention.
Figure 27:
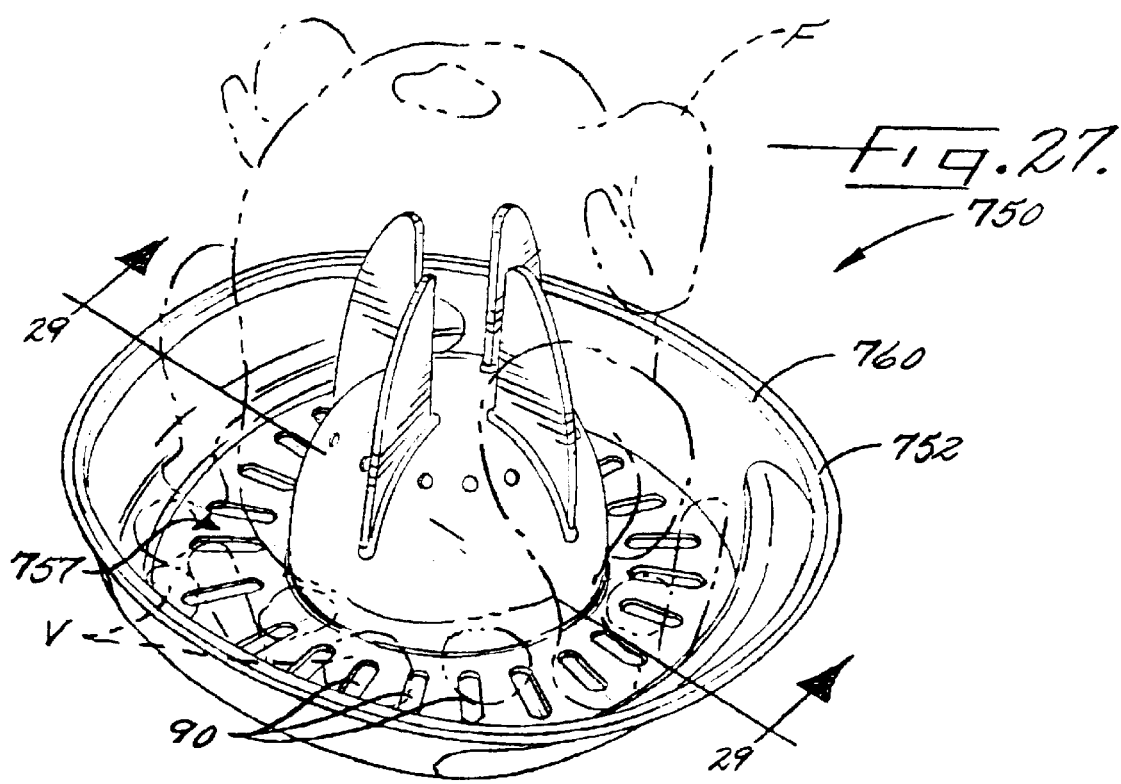
FIG. 27 is a perspective view of a meat cooking apparatus according to a still yet an additional embodiment of the present invention.
Figure 28:
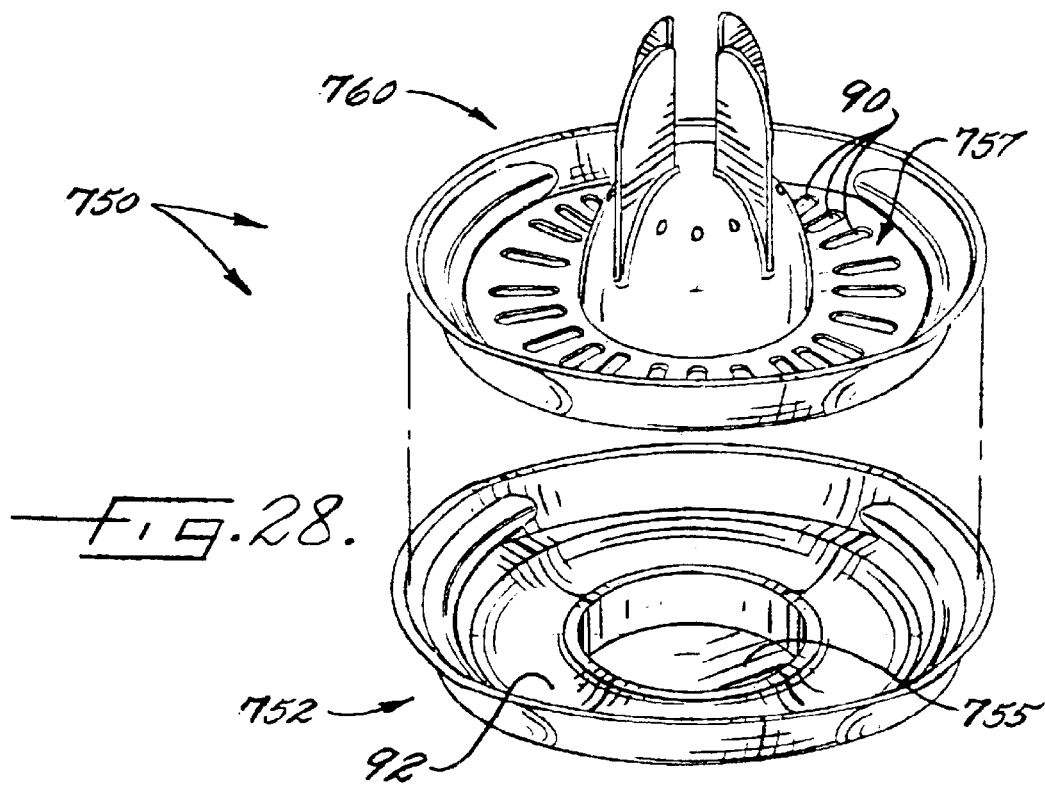
FIG. 28 is an exploded perspective view of a meat cooking apparatus according to the still yet additional embodiment of the present invention.

Accordingly, under pressure, i.e., steam pressure, the outer peripheries of the inner cavity of the fowl F can give or soften to allow some steam to pass between the respective outer peripheries of the inner cavity and the infusor body 62. Nevertheless, the closing off of the lower end of the inner cavity can be quite advantageous in cooking the fowl with steam supplied to the inner cavity through more distal portions of the infusor body which extend into the inner cavity. The infusor body 62 preferably has a substantially dome-type shape according to some embodiments of the present invention (see FIGS. 1–12). Nevertheless, other shaped infusor bodies, such as an hour glass shape (see FIGS. 13–14), oval shape, elliptical, polygonal, and other shapes which preferably provide for closing off of the lower end of the inner cavity of the fowl, can be used as well, as understood by those skilled in the art and according to the present invention.

To further enhance this goal of having a fully closed or substantially closed inner cavity, the meat infusor 62 further includes at least one cavity opening support member 71, 72, 73, 74 connected to and extending outwardly from the infusor body 62 to thereby assist in maintaining the fowl cavity in an open position. This support member or members 71, 72, 73, 74 also provide a heat path for the more distal end portions of the inner cavity to contact, and preferably singe, or otherwise supply heat to these portions of the cavity through these support members 71, 72, 73, 74 (see FIG. 7). The at least one cavity opening support member 71, 72, 73, 74 preferably is provided by a plurality of fin members connected to distal portions of the infusor body 42 and extending outwardly therefrom. When a fowl F, for example, is positioned on the meat infusor 60, the fin members 71, 72, 73, 74 preferably extend upwardly from a horizontal support surface underlying the base 52. Each of the plurality of fin members 71, 72, 73, 74 can advantageously be provided by a relatively thin plate formed integral with the infusor body 62 and extending upwardly and/or outwardly therefrom when the base 52 is positioned in a substantially horizontal plane as illustrated.

The fin members 71, 72, 73, 74 can also be wire frame members (see FIGS. 17–19 and 37–38), a plurality of spike or prong members, or other shapes and configurations which preferably accomplish the function of enhancing opening of and support of the more distal ends of the main inner cavity of the fowl. The wire fin members 571–574, for example, can be welded or otherwise connected to the infusor body along a connecting portion 577, e.g., weld spot. The plurality of fin members 71, 72, 73, 74 are preferably spaced-apart and positioned substantially symmetrical around the infusor body 62 and extend upward from the infusor body 62 when the base 52 is positioned on a horizontally extending cooking surface as illustrated. This position advantageously allows steam from the heated liquid container 55 having liquid therein to rise into the inner cavity of the fowl F and more easily reach and assist in cooking these more distal portions of the inner cavity. The plurality of openings 55 of the infusor body 62 also are preferably positioned between each of the plurality of spaced-apart fin members 71, 72, 73, 74 so that the positioning of the fin members 71, 72, 73, 74 and the openings 64 enhance circulation and access of the steam to the entire inner cavity of the fowl F.

The infusor body preferably advantageously has a low profile for stability purposes and so that more space remains between the infusor body and the distal end opening or plug member so that more space is left for steam to infuse the meat through the inner cavity. Although the meat infusor is positioned in a medial portion of the base of the single infusor embodiments, the meat infusor could be positioned along the base in other areas as well and, although not preferable, could also be used without the base in some embodiments. Also, as shown in FIGS. 20–23, the meat plug member 75', 75" can also have one or more channels 81 formed in the sealing body 82 to engage or abuttingly contact the upper peripheral surfaces of the fin members 71, 72, 73, 74 to provide a heat flow path thereto. In this way, the plug member 75', 75" can be used to provide a temperature measuring device to measure the temperature of the fins of cavities. Additionally, even without the temperature, pressure, or time sensing capabilities (see FIGS. 22–23), the channels 81 provide a tighter or secure fit for the plug member 75', 75". As shown in the embodiment in FIG. 12, and although advantageous, the meat infusor 260 of the apparatus 250 does not require the fin members. This embodiment, for example, can be advantageous where it might be difficult or awkward to clean the fin members or desired to use other cooking techniques. It would also be understood by those skilled in the art that the fin members could be formed to readily detach from the infusor body. This second embodiment of the apparatus 150 also has a base 252, handles 254 connected or formed in the base, a plurality of openings 164 formed in the meat infusor 260, and a meat plug member 175. This meat plug member 175, for example, has steam release openings 178 in a different location than the meat plug member 75 of the first embodiment. The meat plug member 375 could also be positioned to underlie the distal end opening of the fowl as shown in the embodiment of an apparatus 35 in FIGS. 13–14. This embodiment has a meat infusor 360 also has a plurality of openings 364 and has a different shape, e.g., hourglass type, positioned on or connected to the base 362.

The apparatus 50 further preferably includes a meat plug member 75 positioned to insert into outer surfaces of meat, e.g., a fowl, when positioned on the meat infusor 60 and the base 52 to inhibit steam from the meat from readily escaping or rising from a meat cavity, e.g., the main inner cavity of the fowl. The meat plug member 75 preferably forms a distal-end cavity opening seal member positioned to substantially close a distal end opening of the inner cavity of the fowl and substantially prevent steam from readily escaping through the distal end opening. This plug can also advantageously include means for visually-indicating doneness of the meat, e.g., by temperature, time, pressure, or other indications as will be understood by those skilled in the art. The visual indicating means, for example, can be provided by a temperature sensitive membrane 77, e.g., a liquid crystal or other sensors, or other device associated with an outer surface of the plug member 475 and which changes colors or otherwise indicates that a selected temperature has been reached as understood by those skilled in the art. Likewise, time sensitive elements or combinations of time, temperature, pressure or other indicators can be used as well (see FIGS. 20–23). This meat plug member 75 preferably has steam vents 78, passageways, or other paths for slowly releasing or allowing steam from the main inner cavity to pass thereby. The meat plug member 75 can also be positioned and sized to contact distal end portions of one or more, and preferably all, of the plurality of fin members 71, 72, 73, 74 to enhance a heat escaping path and heat conducting path for cooking the meat.

A complete seal or closing off by the meat plug member 75, however, can also be used as well. Although the meat plug member 75 is preferably a device such as illustrated and shown in FIGS. 8, 10, 12, or 20–23 for positioning in a distal end opening in the inner cavity of a fowl, such as the opening adjacent the neck of the fowl where the head and/or neck have been removed, it will also be understood by those skilled in the art that other shapes and types of devices, e.g., even vegetables themselves such as onions or potatoes, can also be used as such a meat plug member 75. In effect, this substantially or fully closing off of the main inner cavity advantageously allows the fowl or other meat to be cooked by at least two types of methods, namely roasting from the heat of the grill (see FIG. 1), oven (see FIG. 4), stove (see FIG. 9), or other heat source and steam infusing from the steam generated and infused into the inner cavity from the heated liquid container 55 and through the infusor 60 (see FIGS. 7–8).

The apparatus 50, 150, 250, 350, 450 as shown, can be for home or commercial use, but also an apparatus 650, 1150 as shown in FIGS. 24–26, 37–38, and 40 which has a plurality of meat infusors 660, 1160 for cooking a plurality of fowl or other meat at substantially the same time can be used as well, as shown in the drawings. These embodiments of the apparatus 650, 1150 can advantageously have a base with a liquid container for each meat infusor as shown with respect to the version for typical home use, e.g., one fowl at a time, can advantageously have a base 652 with channels 1143 between the plurality of liquid containers 1155, or can advantageously have a base 1152 which acts as both the liquid container and the region for collecting drippings from the fowl or steam. The commercial embodiment also preferably has handles for the base 652, 1152, but notably the plurality of meat infusors 660, 1160 can form a common unit or piece which covers the base 652, 1152 as illustrated. Each of the meat infusors 660, 1160 also preferably has a configuration and structure as described above with respect to the home use embodiment. The meat plug members can be used as well with these embodiments to provide a controlled vent, preset, or pressure build venting range of operations for sealing the distal end opening of the meat (i.e., preferably poultry).

As shown in the embodiments of FIGS. 27–31, the apparatus 750, 850 can also include a meat infusor 760, 860 that has a plurality of vents V formed in a lower base surface 90 thereof. These vents V, for example, enhance collection of drippings, liquid, or moisture from the meat so that the drippings, liquid, or moisture more readily collects in the underlying base 752, 852 as shown. These vents V can also enhance cooking of vegetables of the like when positioned there around. The vents V or openings can be integrally formed with or connected to the meat infusor 760, 860 such as in the lower base surface 90 or, alternatively, can be a separate grating member 91 which is supported by the lower surface 90' of the meat infusor 860.

As shown in the embodiment of FIGS. 32–34, one or more heat enhancing members 995 such as a plurality of spaced-apart strip members formed of copper or silver can be added to, connected to, or integrally formed with the base 952 of the apparatus 950. These heat enhancing members 995 provide a path of travel to underlie the liquid container 955 to thereby more quickly heat liquid positioned therein. This quick heat in this region advantageously allows the meat to cook more quickly, but also allows more time for the marinade or other flavoring to penetrate the meat before the outside is finished roasting.

Figure 35:
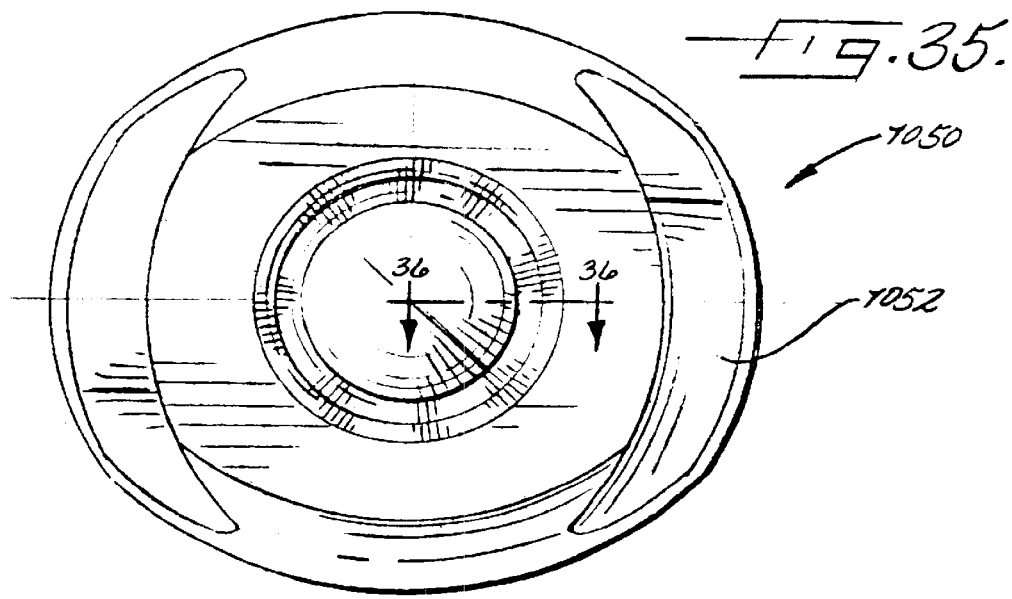
FIG. 35 is a bottom plan view of a meat cooking apparatus according to still yet another further embodiment of the present invention.
Figure 36:
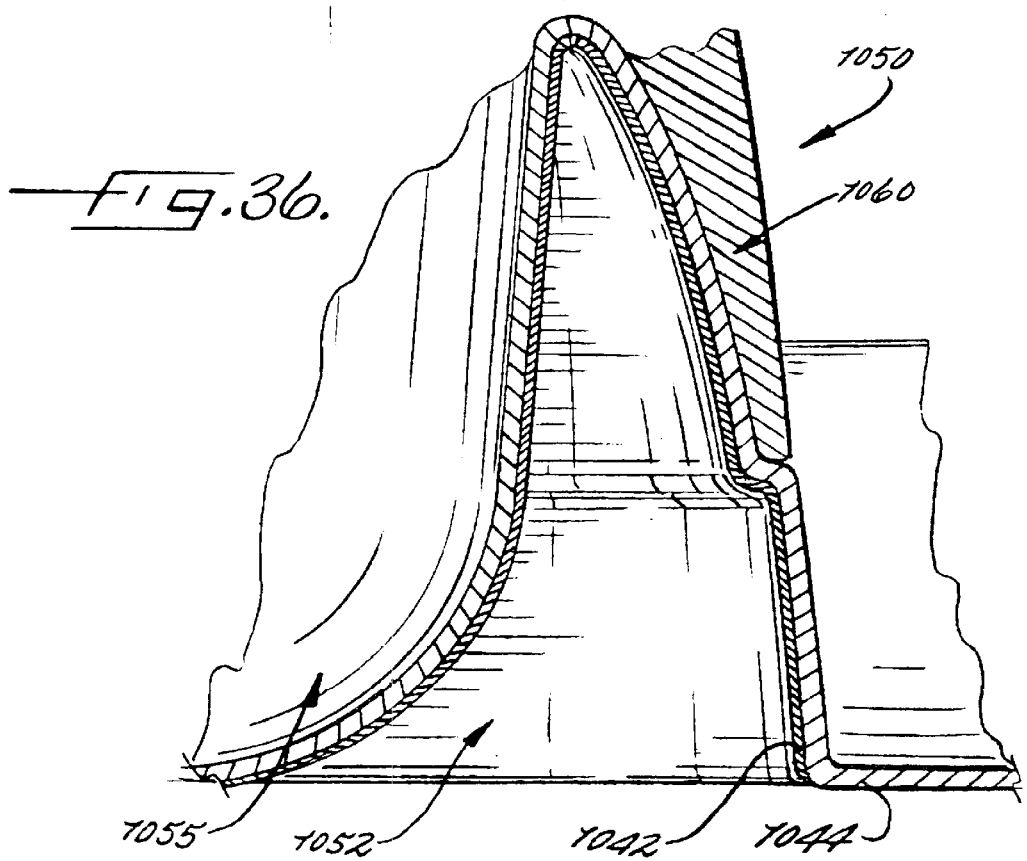
FIG. 36 is a sectional view of a meat cooking apparatus taken along line 36—36 of FIG. 35 according to the still yet another further embodiment of the present invention.
Figure 37:
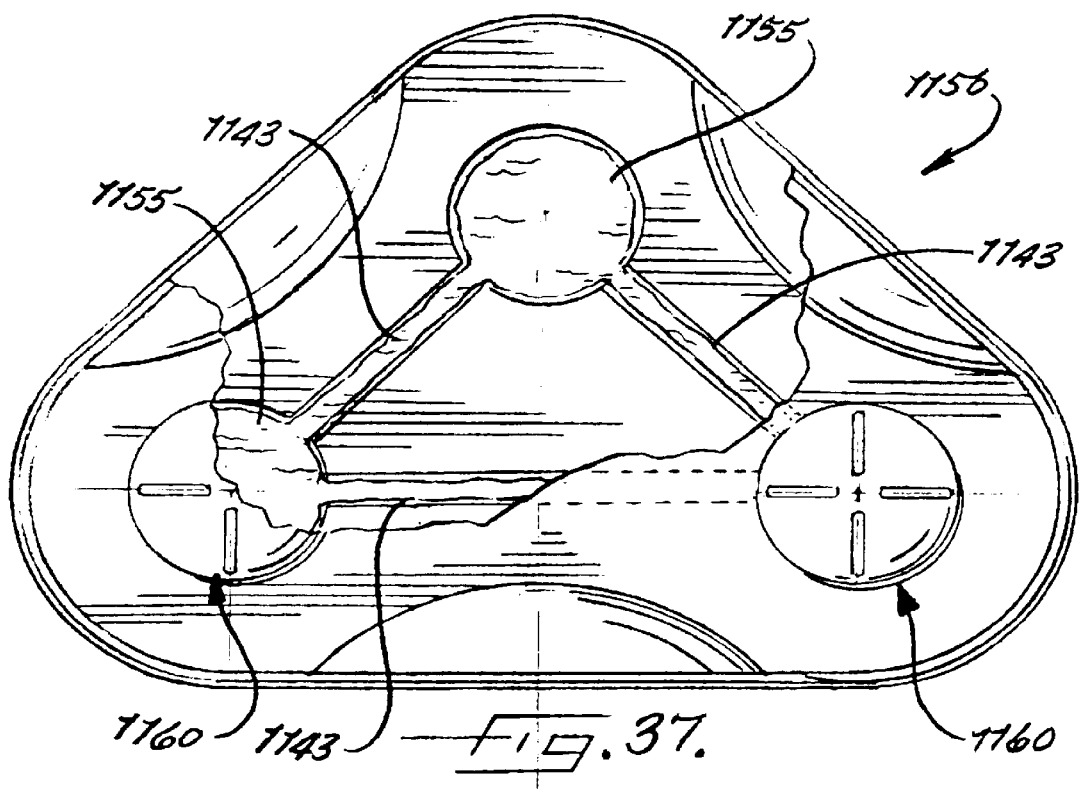
FIG. 37 is a top plan view of a meat cooking apparatus according to still also another embodiment of the present invention.
Figure 38:
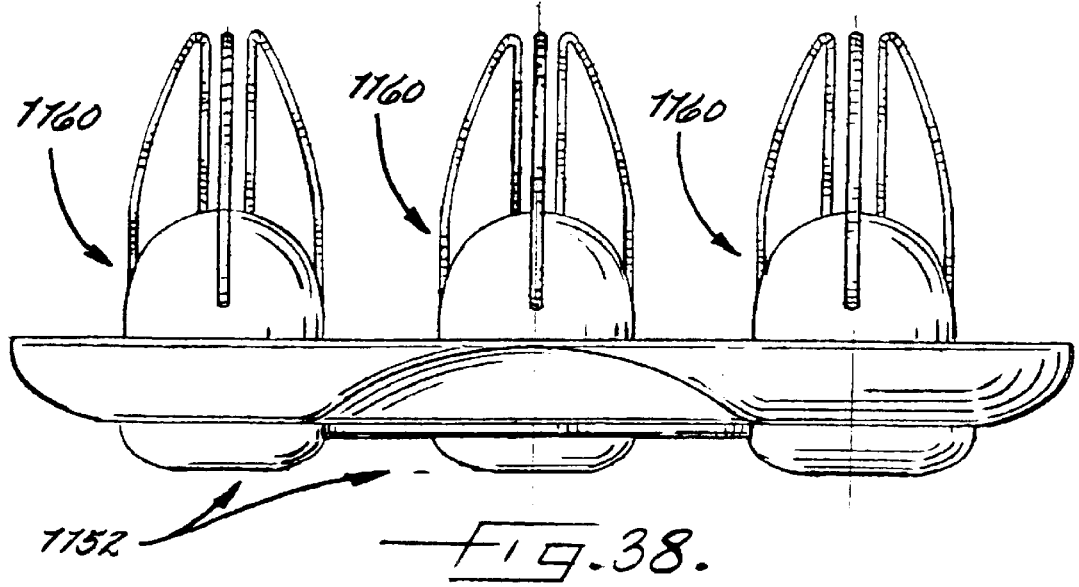
FIG. 38 is an elevational view of a meat cooking apparatus according to the still also another embodiment of the present invention.

As shown in the embodiment of the apparatus 1050 in FIGS. 35–36, the heat enhancing member can also be a layer 1042 of copper or silver (or other heat enhancing material) that forms an underlying layer under the surface 1044 of the liquid container 1055 and in the air gap region of the base 1052 surrounding the liquid container 1055. The meat infusor 1060 would still preferably overlie at least peripheral regions of the liquid container 1055 as well.

As illustrated in FIGS. 1–40, the present invention also advantageously provides a method of cooking meat. This method preferably includes substantially sealing both lower and upper openings of an inner cavity of a fowl F when positioned in a vertical position on a substantially horizontally extending cooking surface and supplying steam to the inner cavity through the lower end or proximal opening of the inner cavity to thereby increase the steam pressure within the inner cavity. As described and illustrated, this method also includes simultaneously supplying roasting heat to the outer surfaces of the fowl when the steam is supplied to the inner cavity when substantially sealed. The steam preferably includes a preselected flavor, e.g., a marinade, beer, lemonade, or other desired selection, and is created from a change of state of a corresponding flavored liquid positioned adjacent the lower opening of the inner cavity and preferably within a liquid container 55 such as shown and described. The method still also can include supplying heat to the flavored liquid to cause the flavored liquid to change states to the flavored steam.

Another method of cooking meat, namely fowl, is provided which preferably includes simultaneously supplying roasting heat to outer surfaces of a fowl and supplying steam to the inner cavity when the inner cavity is substantially sealed. The method can also advantageously include providing a meat infusor 60 to substantially seal a proximal end opening of the inner cavity of the fowl through which steam is supplied to the inner cavity and providing a meat plug member 75 to substantially seal a distal end opening of the inner cavity of the fowl.

Yet another method of cooking meat such as fowl is provided which preferably includes positioning a meat infusor 60 to substantially close off outer peripheries of a proximal end of a main inner cavity of the fowl and supplying steam through the meat infusor 60 to the inner cavity of the fowl. The steam is preferably provided by the step of heating a liquid underlying the meat infusor 60 with a heat source so that the liquid changes state to the steam. The method can also include supplying heat to outer surfaces of the fowl to thereby roast the fowl with the same heat source, e.g., grill, oven, stove, internal heat source, or other heating source, which heats the liquid that changes state to form the steam.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

What is claimed is:

1. An apparatus for cooking meat, the apparatus comprising:
   a base having at least one liquid container connected to an upper surface thereof and a liquid collecting cavity positioned in the base between outer walls of the liquid container and outer peripheries of the base; and
   at least one separate meat infusor positioned to contact the base and to overlie and substantially surround at least inner walls of the liquid container, the meat infusor having an infusor body and a plurality of openings positioned in peripheries of the infusor body so that when liquid positioned in the liquid container heats, steam from the liquid travels through the infusor body, through the openings therein, and toward meat positioned to overlie the infusor body.

2. An apparatus as defined in claim 1, wherein the infusor body has a proximal end portion with a greater circumference than the distal end portion to enhance insertion of the meat infusor into an inner cavity of a fowl to be cooked and enhance closing off of the inner cavity with the proximal end portion when the meat infusor is inserted into the fowl cavity.

3. An apparatus as defined in claim 2, wherein the meat infusor further includes at least one cavity opening support member connected to and extending outwardly from the infusor body to thereby assist in maintaining the fowl cavity in an open position.

4. An apparatus as defined in claim 3, wherein the infusor body has a substantially dome-type shape, and wherein the at least one cavity opening support member comprises a plurality of fin members connected to distal portions of the infusor body and extending outwardly therefrom.

5. An apparatus as defined in claim 4, wherein each of the plurality of fin members comprises a relatively thin plate formed integral with the infusor body, and wherein the plurality of fin members are spaced-apart and positioned substantially symmetrical around the infusor body and extend upward from the infusor body when the base is positioned on a horizontally extending cooking surface.

6. An apparatus as defined in claim 5, wherein the plurality of openings include a plurality of openings positioned between each of the plurality of spaced-apart fin members.

7. An apparatus as defined in claim 1, wherein the outer walls of the liquid container form a peripheral wall of the liquid collecting cavity formed in the base, and wherein the base further includes a plurality of handle members associated with outer peripheries of the base.

8. An apparatus as defined in claim 1, wherein the liquid container includes an infusor body seat associated with the outer walls of the liquid container and substantially surrounding the liquid container to seat the infusor thereon to substantially enclose and cover the liquid container.

9. An apparatus as defined in claim 1, further comprising a meat plug member positioned to insert into outer surfaces of meat when positioned on the meat infusor and the base to inhibit steam from the meat from readily escaping from a meat cavity.

10. An apparatus as defined in claim 9, wherein the meat plug member includes means for visually indicating at least either time or temperature doneness of the meat.

11. An apparatus for cooking meat, the apparatus comprising:
    a base including at least one liquid container connected to an upper surface of the base and having at least one opening in a top region thereof for supplying liquid to be contained therein, the base also including a liquid collecting region positioned in the base between outer walls of the liquid container and outer peripheries of the base; and
    at least one meat infusor associated with the base and positioned to overlie and substantially surround at least inner walls of the liquid container, the meat infusor including an infusor body having a proximal end portion with a greater circumference than the distal end portion to enhance insertion of the meat infusor into an inner cavity of a fowl to be cooked and enhance closing off of the inner cavity with the proximal end portion when the meat infusor is inserted into the fowl cavity, the meat infusor also including a plurality of openings positioned in peripheries of the infusor body so that when liquid positioned in the liquid container heats to change state from the liquid to a steam, the steam from the liquid container travels through the infusor body, through the openings therein, and toward the inner cavity of the fowl positioned to overlie the infusor body.

12. An apparatus as defined in claim 11, wherein the infusor body has a substantially dome-type shape, and wherein the meat infusor has a plurality of fin members connected to distal portions of the infusor body and extending outwardly therefrom.

13. An apparatus as defined in claim 12, wherein each of the plurality of fin members comprises a relatively thin plate formed integral with the infusor body, and wherein the plurality of fin members are spaced-apart and positioned substantially symmetrical around the infusor body and extend upward from the infusor body when the base is positioned on a horizontally extending cooking surface.

14. An apparatus as defined in claim 13, wherein the outer walls of the liquid container form a peripheral wall of the liquid collecting cavity formed in the base, and wherein the base further includes a plurality of handle members associated with outer peripheries of the base.

15. An apparatus as defined in claim 14, wherein the liquid container includes an infusor body seat associated with the outer walls of the liquid container and substantially surrounding the liquid container to seat the infusor thereon to substantially enclose and cover the liquid container.

16. An apparatus as defined in claim 15, further comprising a meat plug member positioned to insert into outer surfaces of meat when positioned on the meat infusor and the base to inhibit steam from the meat from readily escaping from a meat cavity.

17. An apparat us as defined in claim 16, wherein the meat plug member includes means for visually indicating doneness of the meat.

18. An apparatus as defined in claim 17, wherein the plurality of openings include a plurality of openings positioned between each of the plurality of spaced-apart fin members.

19. An apparatus for cooking fowl, the apparatus comprising:
- a proximal-end cavity opening sea l and steam pass in g member positioned to substantially close a proximal end opening of an inner cavity of a fowl and allow steam to pass therethrough to the inner cavity; and
- a distal-end cavity opening seal member positioned to substantially close a distal end opening of the inner cavity of the fowl and substantially prevent steam from readily escaping through the distal end opening.

20. An apparatus as defined in claim 19, wherein the proximal-end cavity opening seal and steam passing member includes at least one meat infusor including an infusor body having a proximal end portion with a greater circumference than the distal end portion to enhance insertion of th e meat infusor into an inner cavity of a fowl to be cooked and enhance closing off of the inner cavity with the proximal end portion when the meat infusor is inserted into th e fowl cavity.

21. An apparatus as defined in claim 20, further comprising a base including at least one liquid container associated with an upper surface of the base and having at least one opening in a top region thereof for supplying liquid to be contained therein, the base also including a liquid collecting region positioned in the upper surface of the base between outer walls of the liquid container and outer peripheries of the base.

22. An apparatus as defined in claim 21, wherein the meat infusor is associated with the base and positioned to overlie and substantially surround at least inner walls of the liquid container.

23. An apparatus as defined in claim 22, wherein the meat infusor includes a plurality of openings positioned in side peripheries of the infusor body so that when liquid positioned in the liquid container heats to change state from the liquid to a steam, the steam from the liquid container travels through the infusor body, through the openings therein, and toward the inner cavity of the fowl positioned to overlie the infusor body.

24. An apparatus as defined in claim 20, wherein the meat infusor further includes at least one cavity opening support member connected to and extending outwardly from the infusor body to thereby assist in maintaining the fowl cavity in an open position.

25. An apparatus as defined in claim 24, wherein the distal-end cavity opening seal member comprises a meat plug member positioned to insert into outer surfaces of the fowl when positioned on the meat infusor and the base to inhibit steam from the fowl from readily escaping from the inner cavity of the fowl.

26. An apparatus as defined in claim 25, wherein the meat plug member includes means for visually indicating doneness of the meat.

* * * * *

UNITED STATES PATENT AND TRADEMARK OFFICE
CERTIFICATE OF CORRECTION

PATENT NO. : 6,487,964 B2  Page 1 of 1
DATED : December 3, 2002
INVENTOR(S) : Ronald William Scharbo, George C. McKerrow, Jr., and Phillip Jack Snoke It is certified that error appears in the above-identified patent and that said Letters Patent is hereby corrected as shown below:

Column 3,
Line 60, please delete "herein" and insert -- therein -- therefor.

Column 6,
Line 51, please delete "wind" and insert -- wine -- therefore.

Column 8,
Line 64, after "360" please insert -- , --.

Column 13,
Line 7, please delete "sea l" and insert -- seal -- therefor, and please delete "pass in g" and insert -- passing -- therefor.
Lines 19-20, please delete "th e" and insert -- the -- therefor.
Line 22, please delete "th e" and insert -- the -- therefor.

Signed and Sealed this

Fourth Day of November, 2003

JAMES E. ROGAN
*Director of the United States Patent and Trademark Office*